(12) United States Patent
Furumiya et al.

(10) Patent No.: US 6,898,175 B2
(45) Date of Patent: *May 24, 2005

(54) OPTICAL DISC HAVING POSITIVE MARKS AND NEGATIVE MARKS IN A SECTOR BLOCK

(75) Inventors: Shigeru Furumiya, Himeji (JP); Hiromichi Ishibashi, Ibaraki (JP); Takashi Ishida, Yawata (JP); Yoshiharu Kobayashi, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 33 days.

This patent is subject to a terminal disclaimer.

(21) Appl. No.: 10/446,018

(22) Filed: May 28, 2003

(65) Prior Publication Data

US 2003/0193880 A1 Oct. 16, 2003

Related U.S. Application Data

(62) Division of application No. 10/169,915, filed as application No. PCT/JP00/09347 on Dec. 27, 2000, now Pat. No. 6,738,342.

(30) Foreign Application Priority Data

Jan. 14, 2000 (JP) .......................................... 2000-6593
Jun. 22, 2000 (JP) ....................................... 2000-187259

(51) Int. Cl.[7] ................................................ G11B 7/24
(52) U.S. Cl. .................................................. 369/275.4
(58) Field of Search .......................... 369/275.4, 275.3, 369/275.1, 13.54, 13.55, 277, 278, 279; 428/64.1, 64.3, 64.4; 430/320, 321

(56) References Cited

U.S. PATENT DOCUMENTS

| 4,825,403 | A | 4/1989 | Gershenson et al. | |
|---|---|---|---|---|
| 5,831,951 | A | 11/1998 | Kamioka et al. | |
| 5,835,461 | A | 11/1998 | Kobayashi et al. | |
| 5,850,382 | A | 12/1998 | Koishi et al. | |
| 6,122,233 | A | 9/2000 | Iketani et al. | |
| 6,160,776 | A | 12/2000 | Seo | |
| 6,259,658 | B1 | 7/2001 | Tanoue et al. | |
| 6,377,537 | B1 | * 4/2002 | Maeda et al. | ............ 369/275.4 |
| 6,400,653 | B1 | 6/2002 | Torazawa et al. | |
| 6,671,238 | B1 | * 12/2003 | Ko et al. | ............ 369/275.4 |

FOREIGN PATENT DOCUMENTS

| EP | 0 177 311 | 4/1996 | |
|---|---|---|---|
| EP | 0 751 508 | 1/1997 | |
| EP | 0 930 611 | 7/1999 | |
| EP | 1 001 409 | 5/2000 | |
| JP | 8-315426 | 11/1996 | |
| JP | 9-282667 A | * 10/1997 | ............ 369/275.4 |
| JP | 11-25492 | 1/1999 | |
| JP | 11-273089 | 10/1999 | |
| JP | 11-273090 | 10/1999 | |
| JP | 11-288518 | 10/1999 | |
| JP | 2000-149271 | 5/2000 | |
| JP | 2000-235713 | 8/2000 | |
| WO | 98/10415 | 3/1998 | |
| WO | WO 98/50914 | 11/1998 | |

* cited by examiner

*Primary Examiner*—Tan Dinh
(74) *Attorney, Agent, or Firm*—Wenderoth, Lind & Ponack L.L.P.

(57) ABSTRACT

An optical disc is provided having marks for dispersed addresses that can be easily detected with high precision. A dispersed address includes synchronization marks, positive marks, and negative marks. The synchronization marks, positive marks, and negative marks are formed along a groove as partial discontinuities or partial modifications in the wobbled groove.

2 Claims, 20 Drawing Sheets

OPTICAL DISC HAVING POSITIVE MARKS AND NEGATIVE MARKS IN A SECTOR BLOCK

This is a Divisional Application of U.S. application Ser. No. 10/169,915, filed Jul. 11, 2002, now U.S. Pat. No. 6,738,342, which is the National Stage of International Application No. PCT/JP00/09347, filed Dec. 27, 2000.

BACKGROUND OF THE INVENTION

1. Field of the Invention

The present invention relates to an optically rewritable optical disc and to an apparatus and method for reading addresses prewritten to the optical disc.

2. Description of Related Art

DVD-RAM, CD-RW, and MD are examples of user-recordable optical discs that have become available in the last few years. This type of recordable optical disc has grooves formed along a spiral or plural concentric tracks with a phase change material or magneto-optical material formed on the groove surface. Addresses for specifying a particular location on the disc are also pre-recorded to the tracks using rewritable marks. This type of address is described in Japanese Patent Laid-Open Publication (kokai) H8-315426.

Kokai H8-315426 describes providing discontinuities in the grooves and using these discontinuous parts for forming a pattern corresponding to the address signal. A pattern corresponding to the address signal is a binary signal that inverts at each discontinuity, an on/off signal used for generating an ATIP (Absolute Time Pregroove) signal. The discontinuities are therefore used simply as a signal indicating presence or absence.

SUMMARY OF THE INVENTION (Technical Problem to be Solved)

More address values and a method for more efficiently assigning address values is needed in order to create an optical disc with an even higher recording density. In an optical disc according to the related art, however, the discontinuities are nothing more than a trigger signal for signal inversion and can carry only one piece of information (trigger data). Numerous marks are therefore required.

Furthermore, the approximate location of a track can be detected with the ATIP signal, but the position where recording starts cannot be precisely determined. This means that when appending a new recording after recording once, or when overwriting data in the middle of a previous recording, new data may be recorded over previously recorded data that is still necessary. Crosstalk also occurs more easily when the track pitch is reduced.

The present invention is directed to a solution for these problems and provides an optical disc wherein discontinuities or modifications are formed in the grooves and two or more meanings are imparted to the discontinuities or modifications in order to provide address information more efficiently.

A further object of the invention is to provide an optical disc whereby the positioning precision of the recording start point can be increased.

A yet further object of the invention is to provide an optical disc enabling the track pitch to be reduced.

A yet further object of the invention is to provide an optical disc that is recordable and playable with full CLV (constant linear velocity) control.

A yet further object of the invention is to provide an apparatus and method of simple design for accurately reading address information from an optical disc having address information containing two or more meanings imparted to discontinuities or modifications formed in the grooves.

The invention as described in a first aspect is a rewritable optical disc with a spiral or concentric track comprising:
 a groove formed with a sinusoidal wobble along the track;
 a sector block disposed along the track;
 sectors formed by dividing each sector block into a plurality of parts;
 a synchronization mark formed in the first sector in each sector block; and
 positive marks or negative marks formed in sectors other than the first sector in each sector block;
  each positive mark being a first groove discontinuity creating a discontinuity of a first width W1 in the track direction of the groove,
  each negative mark being a second groove discontinuity creating a discontinuity of a second width W0 in the track direction of the groove, and
  each synchronization mark being a third groove discontinuity creating a discontinuity of a third width Ws in the track direction.

The invention as described in a second aspect is an optical disc as described in the first aspect, wherein the first, second, and third groove discontinuities have a mirror surface.

The invention as described in a third aspect is an optical disc as described in the first aspect, wherein the first, second, and third groove discontinuities are formed in maximum amplitude parts of the wobble groove.

The invention as described in a fourth aspect is an optical disc as described in the first aspect, wherein the first, second, and third groove discontinuities are formed in the minimum amplitude part of the wobble groove.

The invention as described in a fifth aspect is an optical disc as described in the first aspect, wherein the first, second, and third widths W1, W0, and Ws are all longer than the longest mark contained in data recorded to a groove and less than or equal to ½ wobble period.

The invention as described in a sixth aspect is an optical disc as described in the first aspect, wherein the first, second, and third widths W1, W0, and Ws are all longer than the longest mark contained in data recorded to a groove and less than or equal to ¼ wobble period.

The invention as described in a seventh aspect is an optical disc as described in the first aspect, wherein the ratio between first, second, and third widths W1, W0, and Ws is 1:2:4 where any one of widths W1, W0, and Ws is 1.

The invention as described in an eighth is an optical disc as described in the first aspect, wherein the ratio between first, second, and third widths W1, W0 and Ws is 2:1:4.

The invention as described in a ninth aspect is an optical disc as described in the first aspect, wherein the first, second, and third widths W1, W0, and Ws are two bytes, one byte, and four bytes, respectively.

The invention as described in a tenth aspect is a rewritable optical disc with a spiral or concentric track comprising:
 a groove formed with a sinusoidal wobble along the track;
 a sector block disposed along the track;
 sectors formed by dividing each sector block into a plurality of parts;
 a synchronization mark formed in the first sector in each sector block; and
 positive marks or negative marks formed in sectors other than the first sector in each sector block;

each positive mark, negative mark, and synchronization mark being formed as a groove top offset portion where the groove is locally offset in a first direction perpendicular to the track direction, a groove bottom offset portion where the groove is locally offset in a second direction perpendicular to the track direction, or a combination of groove bottom offset portions and groove top offset portions.

The invention as described in an eleventh aspect is an optical disc as described in the tenth aspect, wherein:

a positive mark is a groove top offset portion;

a negative mark is a groove bottom offset portion; and a synchronization mark is a combination of a groove top offset portion and groove bottom offset portion.

The invention as described in a twelfth aspect is an optical disc as described in the tenth, wherein the groove bottom offset portions and groove top offset portions are disposed at maximum amplitude parts of the wobble groove and are offset in a track center direction.

The invention as described in a thirteenth aspect is an optical disc as described in the tenth aspect, wherein groove bottom offset portions and groove top offset portions of a synchronization mark are mutually adjacent at n+(½) wobble cycles (where n is a positive integer).

The invention as described in a fourteenth aspect is an optical disc as described in the thirteenth aspect, wherein n is 0.

The invention as described in a fifteenth aspect is a rewritable optical disc with a spiral or concentric track comprising:

a groove formed with a sinusoidal wobble along the track;

a sector block disposed along the track;

sectors formed by dividing each sector block into a plurality of parts;

a synchronization mark formed in the first sector in each sector block; and positive marks or negative marks formed in sectors other than the first sector in each sector block;

each positive mark, negative mark, and synchronization mark being formed by a groove ascending-phase inversion part for vertically phase inverting an approximately ¼ wobble cycle part from a trough in the wobble groove, a groove descending-phase inversion part for vertically phase inverting an approximately ¼ wobble cycle part from a peak in the wobble groove, or a combination of a groove ascending-phase inversion part and groove descending-phase inversion part.

The invention as described in a sixteenth aspect is an optical disc as described in the fifteenth aspect, wherein a positive mark is formed by a groove ascending-phase inversion part, a negative mark is formed by a groove descending-phase inversion part, and a synchronization mark is formed by a combination of a groove descending-phase inversion part and groove ascending-phase inversion part.

The invention as described in a seventeenth aspect is an optical disc as described in the fifteenth aspect, wherein both ends of said groove descending-phase inversion parts and groove ascending-phase inversion parts are a groove discontinuity.

The invention as described in an eighteenth aspect is an optical disc as described in the fifteenth aspect, wherein both ends of said groove descending-phase inversion parts and groove ascending-phase inversion parts are an abruptly displaced groove.

The invention as described in a nineteenth aspect is a rewritable optical disc with a spiral or concentric track comprising:

a groove formed with a sinusoidal wobble along the track;

a sector block disposed along the track;

sectors formed by dividing each sector block into a plurality of parts;

a synchronization mark formed in the first sector in each sector block; and positive marks or negative marks formed in sectors other than the first sector in each sector block;

each positive mark, negative mark, and synchronization mark being formed by a groove ascending-rectilinear portion connected to the wobble peak by forming the groove at a trough level from a trough in the wobble groove to an approximately ¼ wobble cycle portion of the wobble groove, then abruptly changing to a peak level and forming the groove at the peak level in the next ¼ wobble cycle portion, a groove descending-rectilinear portion connected to the wobble trough by forming the groove at a peak level from a peak in the wobble groove to an approximately ¼ wobble cycle portion of the wobble groove, then abruptly changing to a trough level and forming the groove at the trough level in the next ¼ wobble cycle portion, or a combination of a groove descending-rectilinear portion and groove ascending-rectilinear portion.

The invention as described in a twentieth aspect is an optical disc as described in the nineteenth aspect, wherein a positive mark is formed by a groove ascending-rectilinear portion, a negative mark is formed by a groove descending-rectilinear portion, and a synchronization mark is formed by a combination of a groove descending-rectilinear portion and groove ascending-rectilinear portion.

The invention as described in a twenty-first aspect is an optical disc as described in the nineteenth aspect, wherein each positive mark, negative mark, and synchronization mark is formed by said groove ascending-rectilinear portion being repeated for a plurality of cycles of the wobbled groove, said groove descending-rectilinear portion being repeated for a plurality of cycles of the wobbled groove, or said combination of a groove descending-rectilinear portion and groove ascending-rectilinear portion being repeated for a plurality of cycles of the wobbled groove.

The invention as described in a twenty-second is an optical disc as described in the twenty-first aspect, wherein each positive mark is formed by said groove ascending-rectilinear portion being repeated for a plurality of cycles of the wobbled groove.

each negative mark is formed by said groove descending-rectilinear portion being repeated for a plurality of cycles of the wobbled groove, and each synchronization mark is formed by said combination of a groove descending-rectilinear portion and groove ascending-rectilinear portion being repeated for a plurality of cycles of the wobbled groove.

The invention as described in a twenty-third aspect is an address reading apparatus for detecting synchronization marks, positive marks, and negative marks contained in an optical disc as described in the first aspect and accumulating 1 and 0 data obtained from positive marks and negative marks dispersedly contained in one sector block to read said sector block address, comprising:

an optical head for emitting a laser beam to a track of the optical disc and detecting reflected light by means of two photodetectors separated along the track direction;

a subtracter for getting a difference of signals from the two photodetectors and generating a difference signal;

a filter for removing a wobble frequency component of a wobbled track and generating a groove discontinuity pulse;

a discriminator for detecting a groove discontinuity pulse width and discriminating each synchronization mark, positive mark, and negative mark based on said width to generate a synchronization mark signal, positive mark signal, and negative mark signal; and a demodulator for generating 1s and 0s according to each positive mark signal and negative mark signal contained between one synchronization mark signal and a next synchronization mark signal.

The invention as described in a twenty-fourth aspect is an address reading method for detecting synchronization marks, positive marks, and negative marks contained in an optical disc as described in the first aspect and accumulating 1 and 0 data obtained from positive marks and negative marks dispersedly contained in one sector block to read said sector block address, comprising:

emitting a laser beam to a track of the optical disc and detecting reflected light by means of two photodetectors separated along the track direction;

getting a difference of signals from the two photodetectors and generating a difference signal;

removing a wobble frequency component of a wobbled track and generating a groove discontinuity pulse;

detecting a groove discontinuity pulse width and discriminating each synchronization mark, positive mark, and negative mark based on said width to generate a synchronization mark signal, positive mark signal, and negative mark signal; and generating 1s and 0s according to each positive mark signal and negative mark signal contained between one synchronization mark signal and a next synchronization mark signal.

The invention as described in a twenty-fifth aspect is an address reading apparatus for detecting synchronization marks, positive marks, and negative marks contained in an optical disc as described in the tenth aspect and accumulating 1 and 0 data obtained from positive marks and negative marks dispersedly contained in one sector block to read said sector block address, comprising:

an optical head for emitting a laser beam to a track of the optical disc and detecting reflected light by means of two photodetectors separated along the track direction;

a subtracter for getting a difference of signals from the two photodetectors and generating a difference signal;

a filter for removing a wobble frequency component of a wobbled track and generating a groove bottom offset portion pulse in a negative direction and a groove top offset portion pulse in a positive direction;

discriminators for discriminating each synchronization mark, positive mark, and negative mark based on said groove top offset portion pulse, groove bottom offset portion pulse, and groove bottom offset portion pulse and groove top offset portion pulse pair to generate a positive mark signal, negative mark signal, and synchronization mark signal; and a demodulator for generating 1s and 0s according to each positive mark signal and negative mark signal contained between one synchronization mark signal and a next synchronization mark signal.

The invention as described in a twenty-sixth aspect is an address reading method for detecting synchronization marks, positive marks, and negative marks contained in an optical disc as described in the tenth aspect and accumulating 1 and 0 data obtained from positive marks and negative marks dispersedly contained in one sector block to read said sector block address, comprising:

emitting a laser beam to a track of the optical disc and detecting reflected light by means of two photodetectors separated along the track direction;

getting a difference of signals from the two photodetectors and generating a difference signal;

removing a wobble frequency component of a wobbled track and generating a groove bottom offset portion pulse in a negative direction and a groove top offset portion pulse in a positive direction;

discriminating each synchronization mark, positive mark, and negative mark based on said groove top offset portion pulse, groove bottom offset portion pulse, and groove bottom offset portion pulse and groove top offset portion pulse pair to generate a positive mark signal, negative mark signal, and synchronization mark signal; and generating 1s and 0s according to each positive mark signal and negative mark signal contained between one synchronization mark signal and a next synchronization mark signal.

The invention as described in a twenty-seventh aspect is an address reading apparatus for detecting synchronization marks, positive marks, and negative marks contained in an optical disc as described in the fifteenth aspect and accumulating 1 and 0 data obtained from positive marks and negative marks dispersedly contained in one sector block to read said sector block address, comprising:

an optical head for emitting a laser beam to a track of the optical disc and detecting reflected light by means of two photodetectors separated along the track direction;

a subtracter for getting a difference of signals from the two photodetectors and generating a difference signal;

a filter for removing a wobble frequency component of a wobbled track and generating a groove descending-phase inversion part pulse in a negative direction and a groove ascending-phase inversion part pulse in a positive direction;

discriminators for discriminating each synchronization mark, positive mark, and negative mark based on said groove ascending-phase inversion part pulse, groove descending-phase inversion part pulse, and groove descending-phase inversion part pulse and groove ascending-phase inversion part pulse pair to generate a positive mark signal, negative mark signal, and synchronization mark signal; and a demodulator for generating 1s and 0s according to each positive mark signal and negative mark signal contained between one synchronization mark signal and a next synchronization mark signal.

The invention as described in a twenty-eighth aspect is an address reading method for detecting synchronization marks, positive marks, and negative marks contained in an optical disc as described in the fifteenth aspect and accumulating 1 and 0 data obtained from positive marks and negative marks dispersedly contained in one sector block to read said sector block address, comprising:

emitting a laser beam to a track of the optical disc and detecting reflected light by means of two photodetectors separated along the track direction;

getting a difference of signals from the two photodetectors and generating a difference signal;

removing a wobble frequency component of a wobbled track and generating a groove descending-phase inversion part pulse in a negative direction and a groove ascending-phase inversion part pulse in a positive direction;

discriminating each synchronization mark, positive mark, and negative mark based on said groove ascending-phase inversion part pulse, groove descending-phase inversion part pulse, and groove descending-phase inversion part pulse and groove ascending-phase inversion part pulse pair to generate a positive mark signal, negative mark signal, and synchronization mark signal; and generating 1s and 0s according to each positive mark signal and negative mark signal contained between one synchronization mark signal and a next synchronization mark signal.

The invention as described in a twenty-ninth aspect is an address reading apparatus for detecting synchronization marks, positive marks, and negative marks contained in an optical disc as described in the nineteenth aspect and accumulating 1 and 0 data obtained from positive marks and negative marks dispersedly contained in one sector block to read said sector block address, comprising:

an optical head for emitting a laser beam to a track of the optical disc and detecting reflected light by means of two photodetectors separated along the track direction;

a subtracter for getting a difference of signals from the two photodetectors and generating a difference signal;

a filter for removing a wobble frequency component of a wobbled track and generating a groove descending-rectilinear portion pulse in a negative direction and a groove ascending-rectilinear portion pulse in a positive direction;

discriminators for discriminating each synchronization mark, positive mark, and negative mark based on said groove ascending-rectilinear portion pulse, groove descending-rectilinear portion pulse, and groove descending-rectilinear portion pulse and groove ascending-rectilinear portion pulse pair to generate a positive mark signal, negative mark signal, and synchronization mark signal; and a demodulator for generating 1s and 0s according to each positive mark signal and negative mark signal contained between one synchronization mark signal and a next synchronization mark signal.

The invention as described in a thirtieth aspect is an address reading method for detecting synchronization marks, positive marks, and negative marks contained in an optical disc as described in the nineteenth aspect and accumulating 1 and 0 data obtained from positive marks and negative marks dispersedly contained in one sector block to read said sector block address, comprising:

emitting a laser beam to a track of the optical disc and detecting reflected light by means of two photodetectors separated along the track direction;

getting a difference of signals from the two photodetectors and generating a difference signal;

removing a wobble frequency component of a wobbled track and generating a groove descending-rectilinear portion pulse in a negative direction and a groove ascending-rectilinear portion pulse in a positive direction;

discriminating each synchronization mark, positive mark, and negative mark based on said groove ascending-rectilinear portion pulse, groove descending-rectilinear portion pulse, and groove descending-rectilinear portion pulse and groove ascending-rectilinear portion pulse pair to generate a positive mark signal, negative mark signal and synchronization mark signal; and generating 1s and 0s according to each positive mark signal and negative mark signal contained between one synchronization mark signal and a next synchronization mark signal.

The invention as described in a thirty-first is an address reading apparatus for detecting synchronization marks, positive marks, and negative marks contained in an optical disc as described in the twenty-first aspect and accumulating 1 and 0 data obtained from positive marks and negative marks dispersedly contained in one sector block to read said sector block address, comprising:

an optical head for emitting a laser beam to a track of the optical disc and detecting reflected light by means of two photodetectors separated along the track direction;

a subtracter for getting a difference of signals from the two photodetectors and generating a difference signal;

a filter for removing a wobble frequency component of a wobbled track and generating a groove descending-rectilinear portion pulse in a negative direction and a groove ascending-rectilinear portion pulse in a positive direction;

a first counter for counting a number of groove descending-rectilinear portion pulses in a negative direction contained in one sector;

a second counter for counting a number of groove ascending-rectilinear portion pulses in a positive direction contained in one sector;

discriminators for comparing a first count from the first counter and a second count from the second counter and discriminating each synchronization mark, positive mark, and negative mark according to whether the first count is sufficiently high, the second count is sufficiently high, or the first count and second count are substantially equal to generate a positive mark signal, negative mark signal, and synchronization mark signal; and a demodulator for generating 1s and 0s according to each positive mark signal and negative mark signal contained between one synchronization mark signal and a next synchronization mark signal.

The invention as described in a thirty-second aspect is an address reading method for detecting synchronization marks, positive marks, and negative marks contained in an optical disc as described in the twenty-first aspect and accumulating 1 and 0 data obtained from positive marks and negative marks dispersedly contained in one sector block to read said sector block address, comprising:

emitting a laser beam to a track of the optical disc and detecting reflected light by means of two photodetectors separated along the track direction;

getting a difference of signals from the two photodetectors and generating a difference signal;

removing a wobble frequency component of a wobbled track and generating a groove descending-rectilinear portion pulse in a negative direction and a groove ascending-rectilinear portion pulse in a positive direction;

counting a number of groove descending-rectilinear portion pulses in a negative direction contained in one sector as a first count;

counting a number of groove ascending-rectilinear portion pulses in a positive direction contained in one sector as a second count;

comparing the first count and second count and discriminating each synchronization mark, positive mark, and negative mark according to whether the first count is sufficiently high, the second count is sufficiently high, or the first count and second count are substantially equal to generate a positive mark signal, negative mark signal, and synchronization mark signal; and generating 1s and 0s according to each positive mark signal and negative mark signal contained between one synchronization mark signal and a next synchronization mark signal.

The invention as described in a thirty-third aspect is an optical disc as described in the nineteenth aspect, wherein the synchronization mark further has a block mark indicating a sector block starting position.

The invention as described in a thirty-fourth aspect is an optical disc as described in the thirty-third aspect, wherein said block mark is formed by disposing a discontinuity in the track groove.

The invention as described in a thirty-fifth aspect is an optical disc as described in the thirty-third aspect, wherein said block mark is formed by locally changing a width of the track groove.

The invention as described in a thirty-sixth aspect is an optical disc as described in the thirty-third aspect, wherein said block mark is formed by locally changing wobble amplitude.

The invention as described in a thirty-seventh aspect is an optical disc as described in the nineteenth aspect, wherein each wobble cycle is formed so that the duty ratio differs according to positive data and negative data.

The invention as described in a thirty-eighth aspect is an optical disc as described in the nineteenth aspect, wherein only one edge of the track groove is wobbled.

(Advantages over the Related Art)

According to the present invention, a meaning other than simply identifying the presence or absence of a modification can be imparted to each groove modification by forming groove modifications of multiple different shapes in a wobble groove. More information can therefore be recorded with fewer groove modifications.

An address reader of simple configuration according to the present invention can also accurately and efficiently read dispersed addresses.

DESCRIPTION OF THE PREFERRED EMBODIMENTS

The preferred embodiments of the present invention are described below with reference to the accompanying figures.

Embodiment 1

Figure 1A:
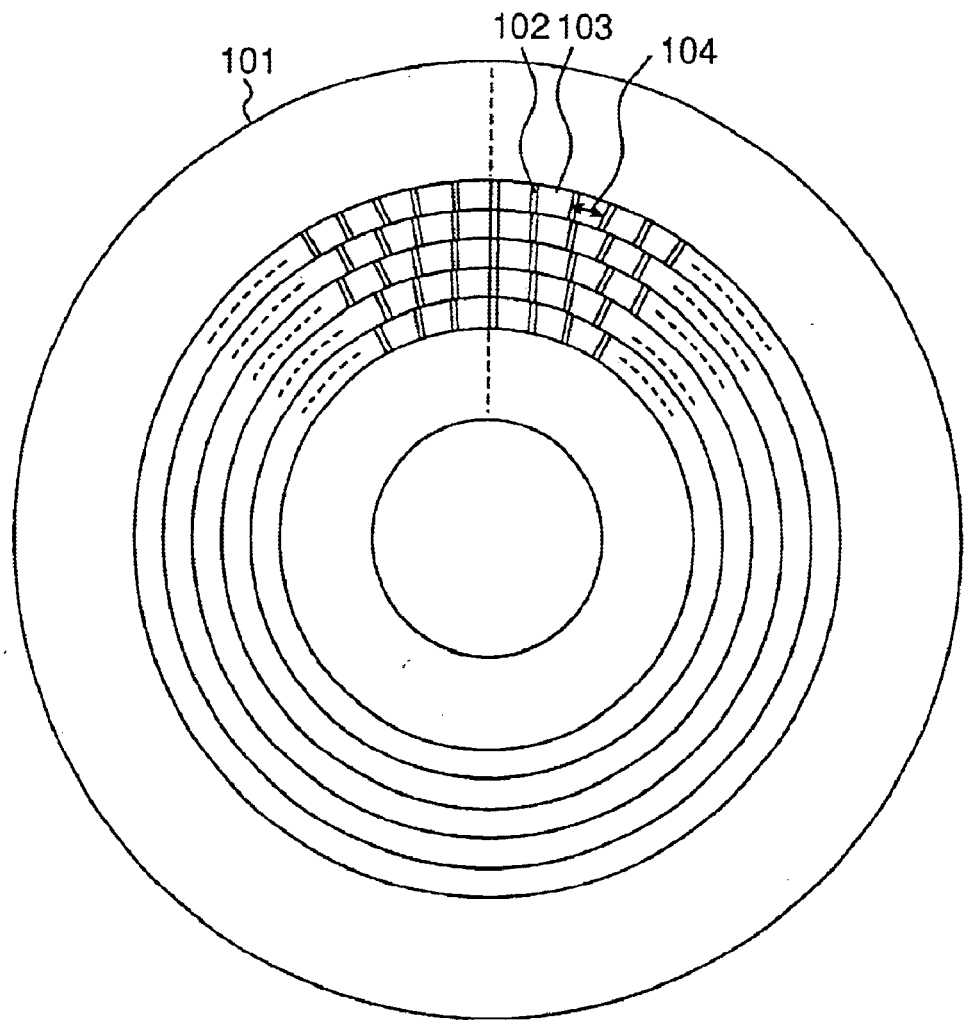
FIG. 1A is a plan view of an optical disc according to a preferred embodiment of the present invention.
Figure 1B:
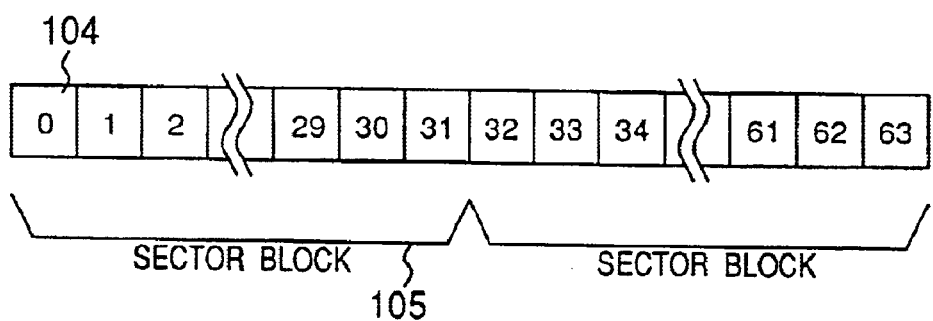
FIG. 1B is a schematic view of a sector block.

FIG. 1A is a plan view of an optical disc according to a preferred embodiment of the present invention, and FIG. 1B describes the placement of sector blocks. Shown in FIG. 1A are the optical disc substrate 101, header 102 that is preformed when the disc is made, recording area 103 where data can be recorded, and sector 104, which is the data recording unit. FIG. 1B shows a sector block 105 containing a specific number (such as 32) of sectors.

A phase change film is formed on the optical disc substrate 101. Data is recorded to this phase change film by optically changing this phase change film between amorphous and crystalline phases, and signals are read using the difference in reflectivity between amorphous and crystal phase parts.

Figure 2A:
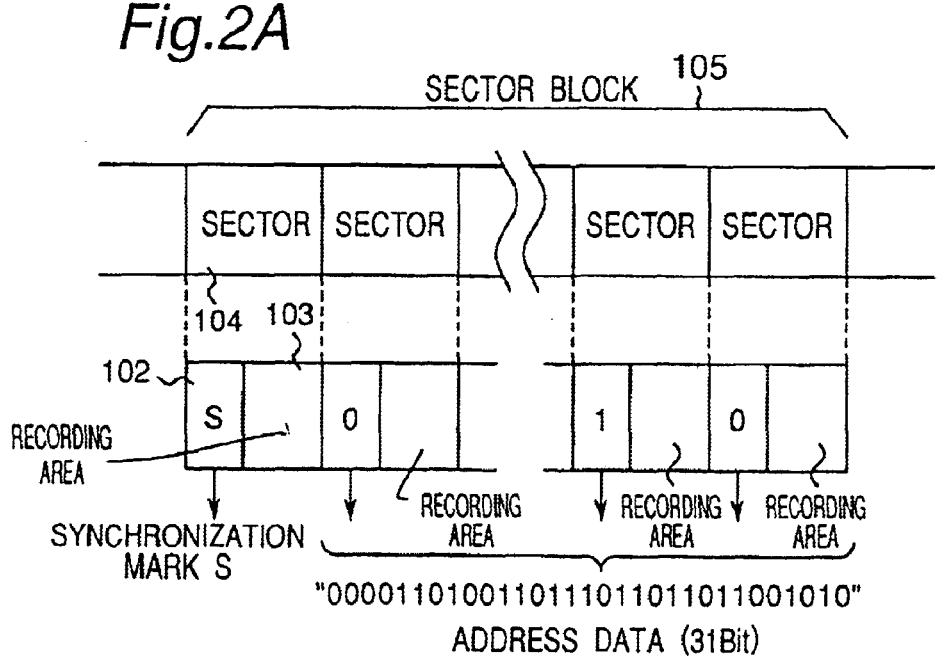
FIG. 2A is descriptive drawing of a dispersed address recorded to the center block.

The relationship between sectors 104 and sector block 105 is described in detail next with reference to FIG. 2A.

In an optical disc according to this embodiment of the invention a track comprises a number of consecutive sector blocks 105. As noted above, each sector block 105 contains 32 sectors 104. Each sector 104 starts with a header 102 followed by a recording area 103 where signals are recorded and reproduced. A sector is 2448 bytes long.

A synchronization mark S is recorded in the header 102 of the first sector 104 in each sector block 105. The start of a sector block 105 can be detected by detecting this synchronization mark S.

A positive mark or negative mark is recorded in the header 102 of the second sector 104 in each sector block 105. A value of 1 is below assumed to be assigned to positive marks and a value of 0 assigned to negative marks. In the example shown in FIG. 2A, a negative mark 0 is recorded to the header 102 of the second sector 104. It is thus possible to assign one bit of information to the header in the second and successive sectors 104 (referred to below as successive sectors).

It is therefore possible to generate 31 bits of information using the synchronization mark S and the following positive marks (1) and negative marks (0) by accumulating these data bits from the headers of the 32 sectors in a sector block 105. Stated another way, 31 bits of information can be dispersed one bit at a time to the 31 sectors 104 in a sector block 105, and a synchronization mark is disposed at the beginning of each sector block 105 so that the start of each sector block 105 can be detected. An address having 0 and 1 bits thus dispersed is referred to herein as a "dispersed address."

These 31 bits include 19 bits of primary data and 12 bits of secondary data. The 19-bit primary data identifies the sector block 105 position. This enables detecting the location of (2 to the 19th power=) 524,288 sector blocks 105. This means that if the address of the first sector block in the optical disc is 0 and the sector block address value increments 1 at each successive sector block, the value yielded by the 19-bit primary data is the absolute address of each sector block 105, and each sector 104 stores 2048 bytes of data and each sector block 105 thus stores 65,536=(2048*32) bytes, then addresses enabling a maximum 34 gigabytes of data can be assigned using this 19-bit address data.

The 12-bit secondary data is allocated to an error correction code enabling correction if any particular bit in the 19-bit primary data or 12-bit secondary data is dropped because of a disc defect, for example, or is erroneously detected during playback. This could be an error correction code for all 31 data bits. Furthermore, because the sector block 105 address value increments one in each successive sector block 105 and the higher bits can be predicted from a preceding sector block 105, the 12-bit secondary data could be an error correction code for the lower 8-bits.

A dispersed address is described in further detail in Japanese Patent Application H11-343060.

Figure 2B:
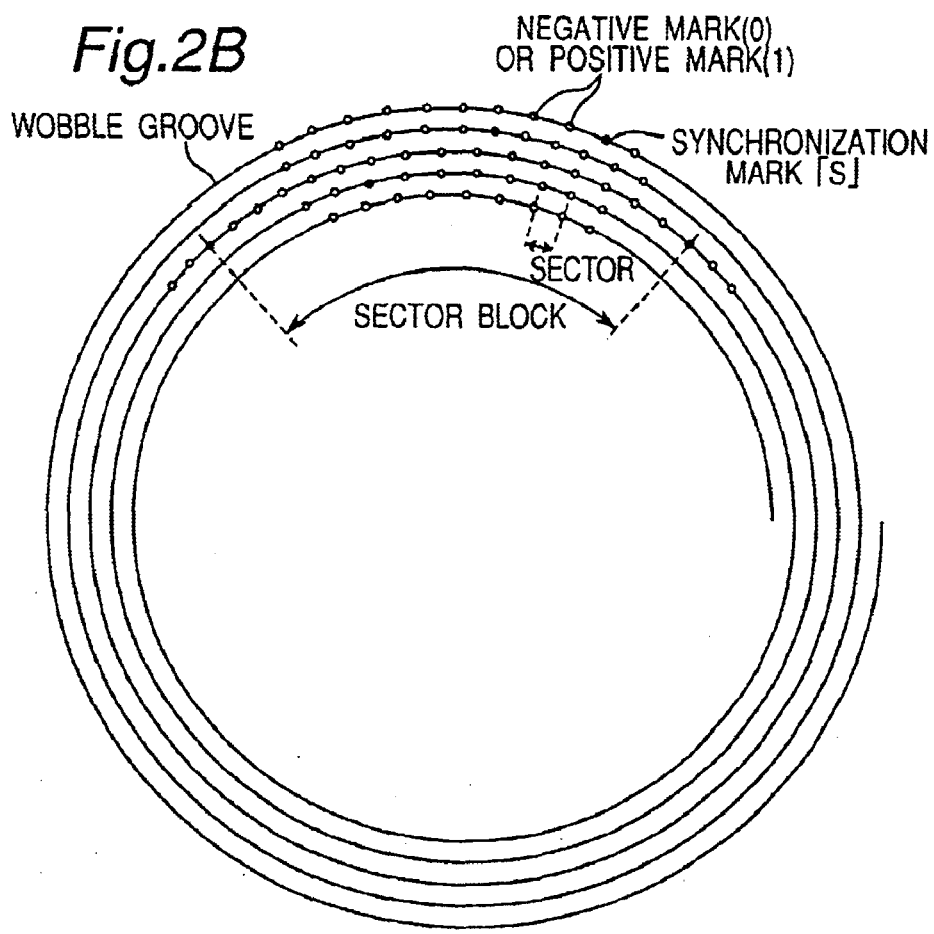
FIG. 2B is a schematic drawing of a groove in which dispersed address marks are formed.

As shown in FIG. 2B, an optical disc 101 according to the present invention has multiple spiral or concentric (spiral in this embodiment) tracks divided into sectors. In the example shown in FIG. 1A sector headers (containing the synchronization mark S, positive mark (1) or negative mark (0)) are aligned along virtual lines in the radial direction of the disc, but the headers do not align in any radial direction in the example shown in FIG. 2B.

Figure 3:
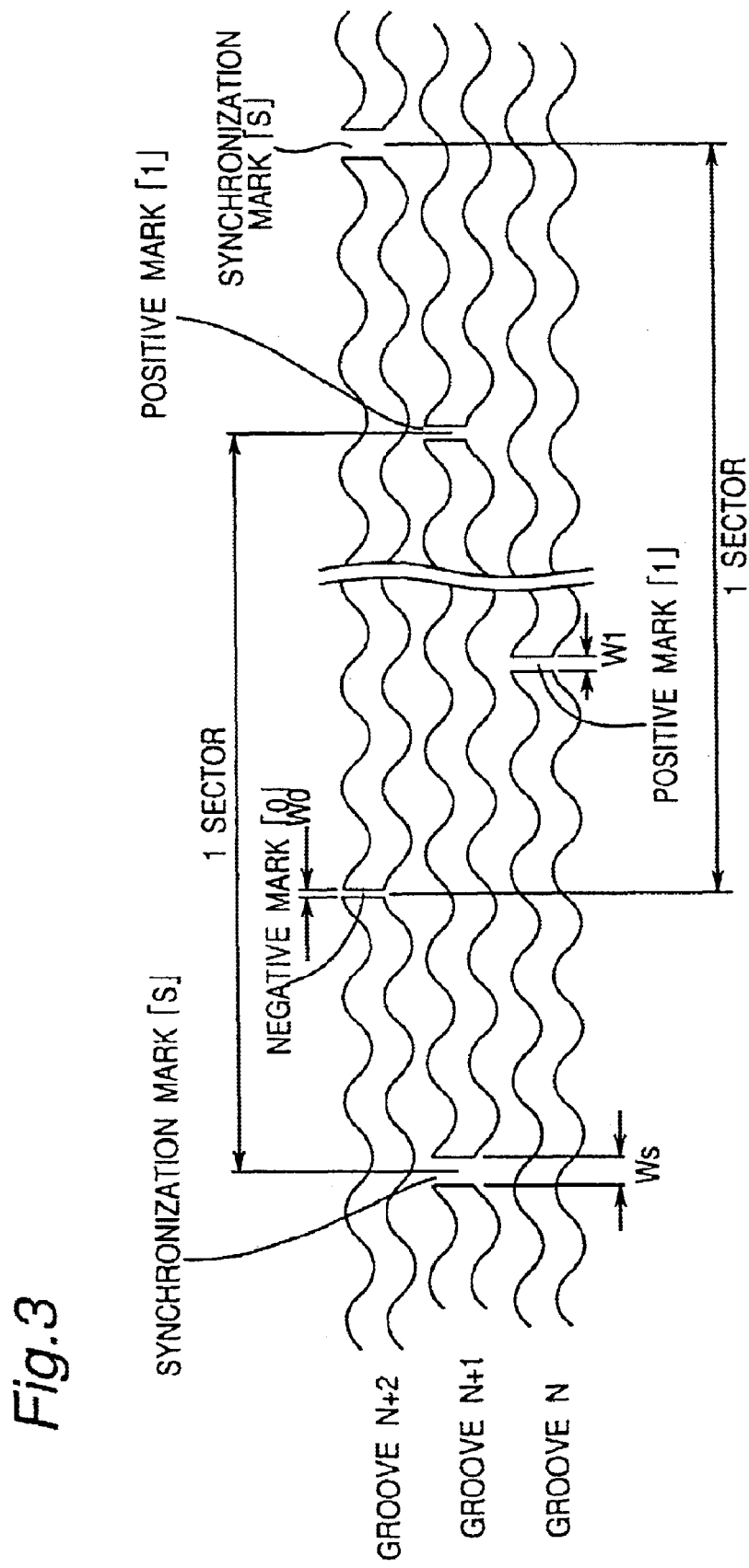
FIG. 3 is a partially enlarged view of an optical disc having groove discontinuities according to a preferred embodiment of the invention.

As shown in FIG. 3, the tracks are grooves and the space between adjacent tracks, such as the space between groove n and groove n+1, is a land. The lands have a mirror surface. The grooves are wave-shaped wobble grooves. The wobble wave has a frequency of 153 cycles per sector, for example. The wobble period thus corresponds to 16 bytes. If the data is recorded with 8–16 modulation and one clock period is T, the shortest mark is 3T and the longest mark is 14T, and one byte is 16T.

In this embodiment of the invention, a positive mark (1) is formed by a discontinuity of width W1 in the track direction in the first groove, a negative mark (0) is formed by a discontinuity of a width W0 in the track direction in a second groove, and a synchronization mark S is formed by a discontinuity of width Ws in the track direction in a third groove. These groove discontinuities have a mirror surface such as found in the lands.

The synchronization marks S, positive marks, and negative marks do not need to be aligned in the radial direction of the optical disc. The sector length can therefore be the same at any position on the disc, and full CLV control can be achieved.

Recording start positions can also be precisely determined because recording can start immediately following a groove discontinuity.

Synchronization marks, positive marks, and negative marks can be formed using the groove discontinuities as follows.

Before the grooves are formed the optical disc has a mirror surface coated with a photoresist. The wobble grooves are formed by emitting a laser oscillating perpendicularly to the track while the disc rotates. When the laser is interrupted during groove formation a discontinuity resulting in a synchronization mark S, positive mark (1), or negative mark (0) is formed in the groove with the length of the discontinuity determined by how long laser emission is interrupted. In a preferred embodiment of the invention the synchronization marks S, positive marks (1), and negative marks (0) are formed at the peaks or troughs of the wobble groove, that is, where the amplitude is greatest, in order to make the groove discontinuities easier to detect. A single beam laser can therefore be used to cut the grooves by thus forming the marks in groove discontinuities.

The widths Ws, W1, W0 of the groove discontinuities corresponding to synchronization mark S, positive mark (1), and negative mark (0), respectively, are determined as follows.

Mark width is preferably greater than the longest mark in the recorded data (i.e., longer than 14T in the present example) so that recorded data signals that leak into the tracking error signal as noise are not mistakenly recognized as a dispersed address, that is, a signal from a synchronization mark S, positive mark (1), or negative mark (0).

Furthermore, the synchronization marks S, positive marks (1), and negative marks (0) are disposed where wobble signal amplitude is greatest. Mark width must therefore be less than ½ the wobble period and preferably ¼ or less of the wobble period in order to improve detection precision.

The width W of the groove discontinuity corresponding to any synchronization mark S, positive mark (1), or negative mark (0) is therefore $$14T<W<(\text{wobble period}/2) \quad (1)$$

and preferably $$14T<W<(\text{wobble period}/4). \quad (2)$$

To satisfy these conditions (1) and (2) and enable the widths of the groove discontinuities denoting a synchronization mark S, positive mark (1), or negative mark (0) to be easily identified, the width ratio of these marks is set to 4:2:1, for example. While the ratio of the groove discontinuities could be 4:4:4, groove discontinuities in the third groove corresponding to the marks that are most important to recognize, i.e., synchronization marks S, are preferably 4, discontinuities corresponding to the positive marks (1) are 2 (or 1), and discontinuities corresponding to the negative marks (0) are 1 (or 2). Yet more specifically, the widths of these groove discontinuities are as follow.

third groove discontinuities(synchronization marks $S$)=4 bytes first groove discontinuities(positive marks (1))=2 bytes second groove discontinuities(negative marks (0))=1 byte It will be noted that in addition to expressing whether or not a groove discontinuity is present, these groove discontinuities also express three different meanings (that is, positive mark (1), negative mark (0), and synchronization mark S) depending upon the length of the groove discontinuity.

Figure 4:
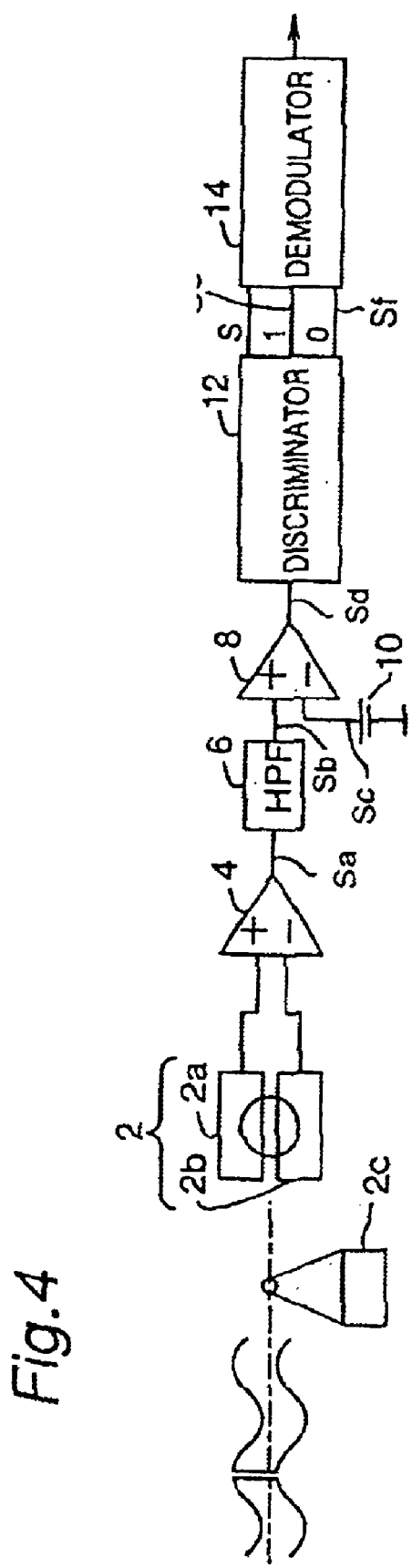
FIG. 4 is a block diagram of an address reader for an optical disc as shown in FIG. 3.
Figure 5:
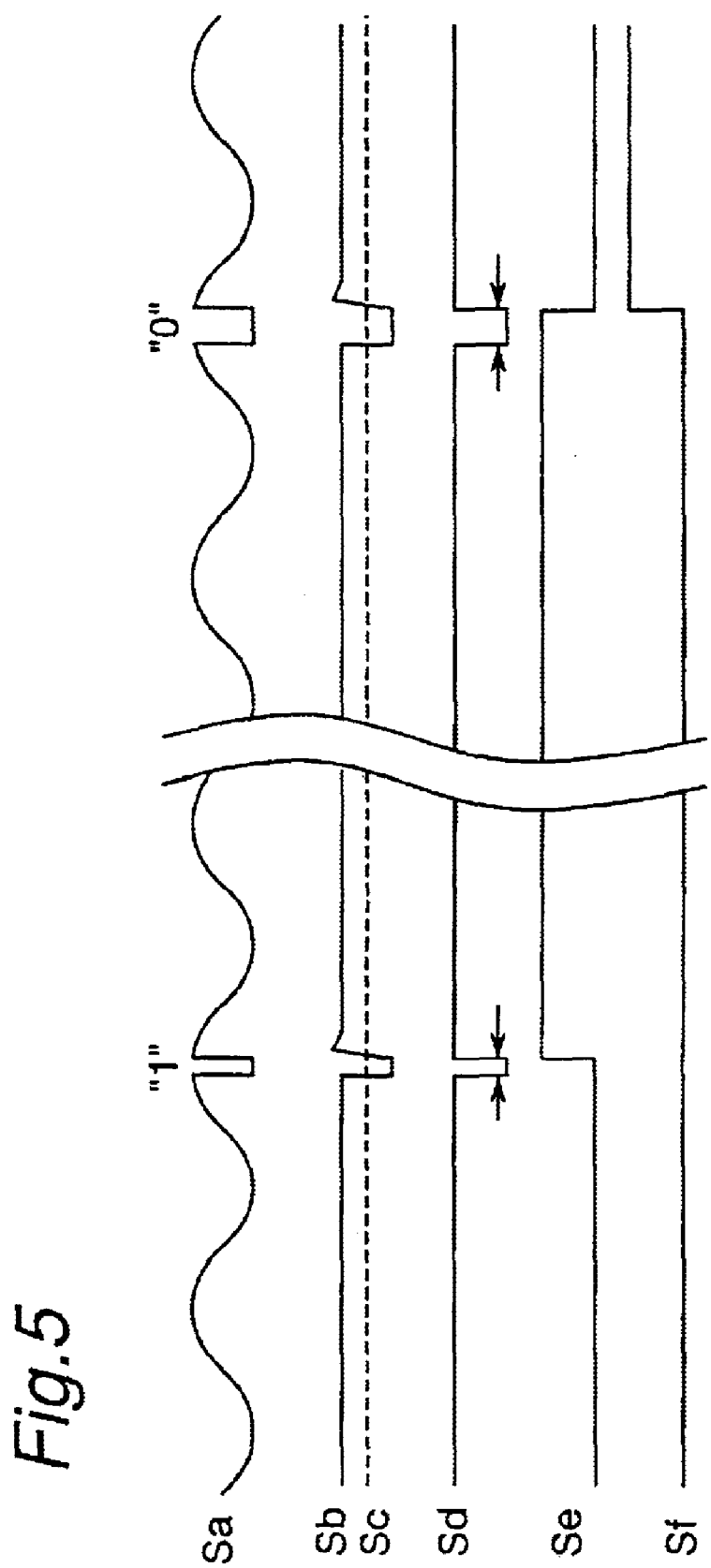
FIG. 5 is a waveform diagram of signals at essential points in the address reader shown in FIG. 4.

FIG. 4 shows a device for reading dispersed addresses such as shown in FIG. 3, and FIG. 5 is a waveform diagram of output signals at important points in the address reader. Referring to FIG. 4, this address reader has an optical head 2, subtracter 4, high pass filter 6, comparator 8, discriminator 12, and demodulator 14. The optical head 2 has a light-emitting element 2c for emitting a laser beam, and photodetectors 2a, 2b offset from each other across the track center. The subtracter 4 obtains the difference of the signals output from photodetectors 2a, 2b, and outputs difference signal Sa (FIG. 5). The high pass filter 6 passes high frequency components and outputs groove discontinuity signal Sb (FIG. 5). The comparator 8 compares the groove discontinuity signal Sb with a specific threshold value Sc supplied from threshold value controller 10 and outputs a binary groove discontinuity signal Sd (FIG. 5). The discriminator 12 then determines if the digitized groove discontinuity signal Sd corresponds to a first groove discontinuity (positive mark (1)), second groove discontinuity (negative mark (0)) or third groove discontinuity (synchronization mark S). The demodulator 14 accumulates the 31 positive marks (1) and negative marks (0) following each synchronization mark S to assemble the dispersed address values into a single continuous address value. The difference signal Sa output from the subtracter 4 is a push-pull signal, and can therefore be used as a tracking error signal.

As shown in FIG. 5 the difference signal Sa describes a sinusoidal wave corresponding to the track wobble. The difference signal Sa drops to zero wherever a groove discontinuity exists, and the signal level therefore drops to zero for a pulse width determined by the width of the discontinuity. The low frequency wave component (the wobble sine wave) is removed from the groove discontinuity signal Sb output by comparator 8, which acts as a filter, and groove discontinuity signal Sb therefore contains only pulses from the groove discontinuities. These pulses are compared with a specific threshold value to generate the digital groove discontinuity signal Sd.

Figure 6:
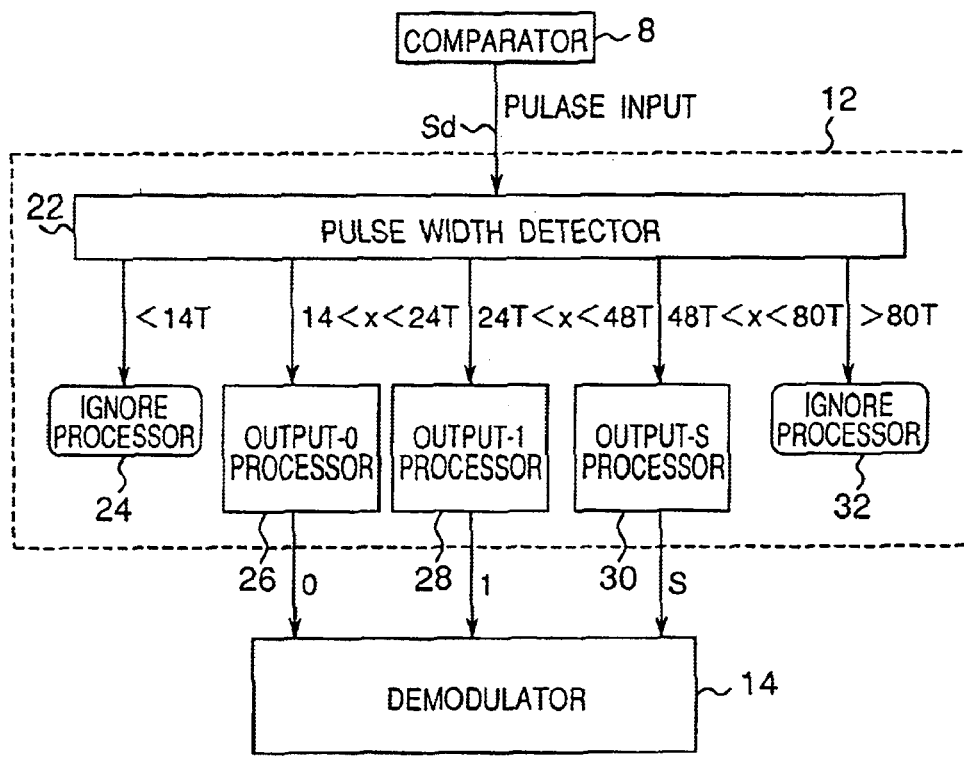
FIG. 6 is a block diagram of the discriminator shown in FIG. 4.

FIG. 6 shows the discriminator 12 in detail. The pulse width detector 22 of this discriminator 12 receives the digital groove discontinuity signal Sd and detects the pulse width therefrom. If the detected pulse width of the groove discontinuity signal Sd is 14T or less, the signal is passed to ignore processor 24 and ignored.

If the detected pulse width of the groove discontinuity signal Sd is 14T or greater and 24T or less, the signal is passed to output-0 processor 26, which thus recognizes a second groove discontinuity signal and outputs signal Se denoting a 0 (FIG. 5). This signal Se is reset by the next groove discontinuity signal Sd.

If the detected pulse width of the groove discontinuity signal Sd is 24T or greater and 48T or less, the signal is passed to output-1 processor 28, which thus recognizes a first groove discontinuity signal and outputs signal Sf denoting a 1 (FIG. 5). This signal Sf is reset by the next groove discontinuity signal Sd.

If the detected pulse width of the groove discontinuity signal Sd is 48T or greater and 80T or less, the signal is passed to output-S processor 30, which thus recognizes a third groove discontinuity signal and outputs signal S denoting the beginning of a sector block. This signal S is reset by the next groove discontinuity signal Sd.

If the pulse width of the detected groove discontinuity signal Sd is 80T or greater, the signal is passed to ignore processor 32 and ignored. It will be obvious that signal Se denoting a 0 corresponds to a negative mark (0), signal Sf denoting a 1 corresponds to a positive mark (1), and signal S corresponds to a synchronization mark S.

Signal Se denoting a 0 output from output-0 processor 26, signal Sf denoting a 1 output from the output-1 processor 28, and signal S from the output-S processor 30 are output to the demodulator 14, which recognizes the dispersed address as a single address.

It will thus be clear that in addition to detecting whether or not the groove is present, the discriminator 12 generates signals with three different meanings (that is, signal Sf denoting 1, signal Se denoting 0, and signal S denoting a synchronization mark) based on the length of the groove discontinuity signal.

Figure 7:
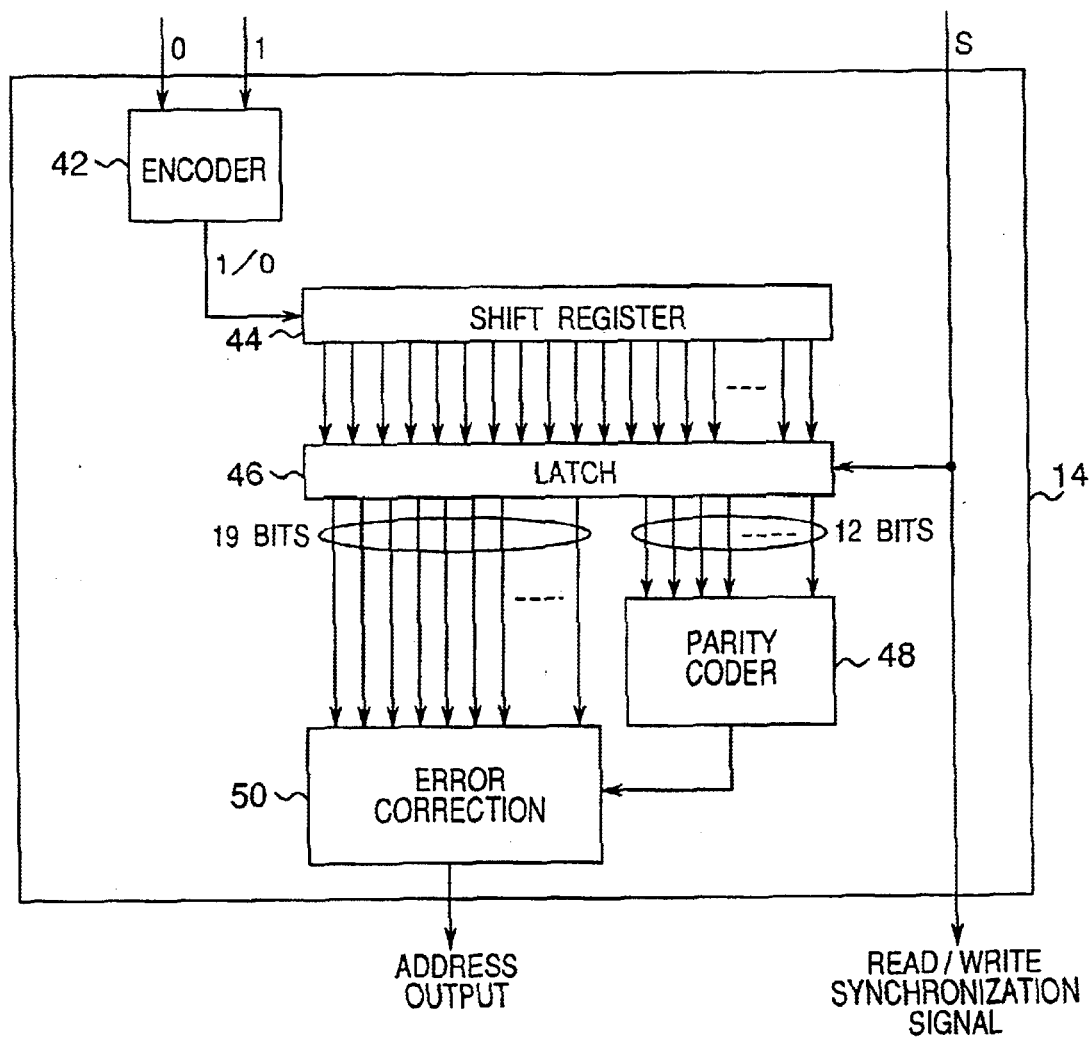
FIG. 7 is a block diagram of the demodulator shown in FIG. 4.

FIG. 7 shows the configuration of demodulator 14 in detail. An encoder 42 converts signal Se to a 1-bit 0 signal and signal Sf to a 1-bit 1 signal. The encoder 42 outputs to the shift register 44, which converts the 1-bit 0 and 1 signals of the 31-bit serial dispersed address to a parallel address. The latch 46 latches the 31-bit address signal in the shift register 44 at signal S. A parity coder 48 uses the low 12 bits of the 31 address bits for a parity check code. The error correction processor 50 uses this parity check code for error correction of the high 19 address bits of the 31 address bits. The demodulator 14 thus outputs a 19-bit address for each sector block.

It should be noted that depending on the type of optical disc, the grooves may refer to trenches or to the lands between trenches. Note that data can later be written to the mirror surface header 102.

The address reader described above features a simple configuration able to efficiently read dispersed addresses. It will also be noted that the synchronization marks, positive marks, and negative marks are read using a difference signal and can therefore be easily separated from data signals recorded to the grooves.

Furthermore, forming the synchronization marks, positive marks, and negative marks within the width of the maximum wobble amplitude prevents an increase in crosstalk between adjacent tracks.

Full CLV control from inside to outside disc circumference can also be achieved because the sectors are formed without changing the sector length between the inside and outside circumference and it is not necessary to align sector block boundaries in the radial direction of the disc. When the boundaries between the sectors and sector blocks where headers are written are aligned in adjacent tracks concentrated in the radial direction of the disc as they are in a zone CLV disc as shown in FIG. 1A, the optical transmittance of the optical disc recording layer differs greatly between the header areas and non-header areas. Different transmittance values create no problem when the optical disc has only one recording layer. When the optical disc has two or more recording layers, however, local variations in recording layer transmittance produce crosstalk between top and bottom layers, and different transmittance values are therefore undesirable. An optical disc according to the present invention as shown in FIG. 2B, however, enables full CLV control, does not require that the headers be substantially aligned in the radial direction of the disc; the headers can therefore be dispersed, and interlayer crosstalk can be reduced in a multilayer optical disc.

Disc capacity can also be increased using full CLV control compared with zone CLV because unused space can be reduced.

The grooves, synchronization marks, positive marks, and negative marks can also be cut using a single beam.

Figure 8:
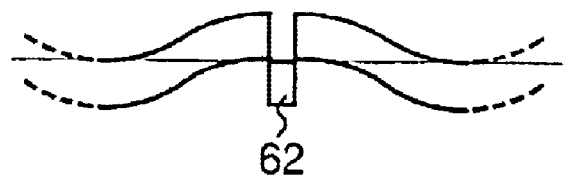
FIG. 8 is an enlarged view showing the groove offset part as a further example of a groove discontinuity.
Figure 9:
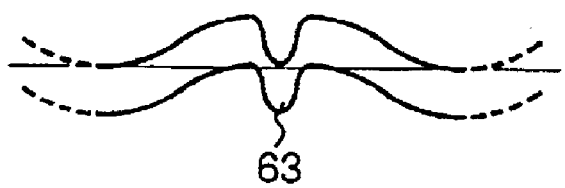
FIG. 9 is an enlarged view showing the groove offset part as a further example of a groove discontinuity.

Furthermore, groove discontinuities are formed in the optical disc described above by interrupting the laser beam used to cut the grooves, but can alternatively be formed as shown in FIG. 8 and FIG. 9 by momentarily shifting the laser beam to form groove offset part 62 or 63. The offset time of the laser is adjusted to control the resulting discontinuities.

It should be noted that the identification marks are disposed at the beginning of each sector in the present embodiment but shall not be limited thereto. The marks could, for example, be detected at the end of the sector.

An optical disc according to the first embodiment described above has groove discontinuities of different lengths formed in the header 102 at the beginning of each sector with each groove discontinuity meaning a synchronization mark S, positive mark (1), or negative mark (0), thereby enabling sector block addresses to be encoded in less space.

Furthermore, an optical disc according to the present invention is suitable as a high density optical disc that is readable and recordable using an approximately 400 nm wavelength laser from the light-emitting element 2c. The reasons for this are described below.

An optical disc according to the present invention is a recordable, readable optical disc having a crystal phase (unrecorded state) phase-change material formed on the disc surface in the grooves. This phase change material is, for example, a germanium-antimony compound or a silver-indium compound. Data is recorded by emitting a laser beam at a specific recording power level to this phase change material to change the crystal phase (unrecorded state) to amorphous phase (recorded state) marks. Reflectivity is different in the crystal phase and amorphous phase parts of the groove. Data can therefore be read by emitting a laser beam at a lower power level, and detecting differences in reflected light from the crystal phase and amorphous phase parts of the groove to reproduce the recorded data. If the laser beam is in the 830 nm or 650 nm waveband, reflections from the amorphous phase (recorded state) parts will be weaker than reflections from the crystal phase (unrecorded state) parts. Furthermore, reflections from the mirror areas are stronger than reflections from the crystal phase parts. Reflections from the mirror, crystal phase, and amorphous phase parts can thus be ranked as strong, medium, and weak, and the three parts can be easily identified.

If a 400 nm laser is used, however, the order of reflectivity changes: reflection from amorphous phase (recorded state) parts is stronger than reflections from crystal phase (unrecorded state) parts. Reflections from the mirror, crystal phase, and amorphous phase parts are therefore ranked slightly strong, medium, strong, and identifying mirror parts from amorphous phase (recorded) parts becomes difficult. With an optical disc according to the present invention, however, the width of the mirror-surface groove discontinuities is distinctly different from the width of the recording marks, and the groove discontinuities can therefore be easily distinguished from the recording marks.

(Embodiment 2)

Figure 10:
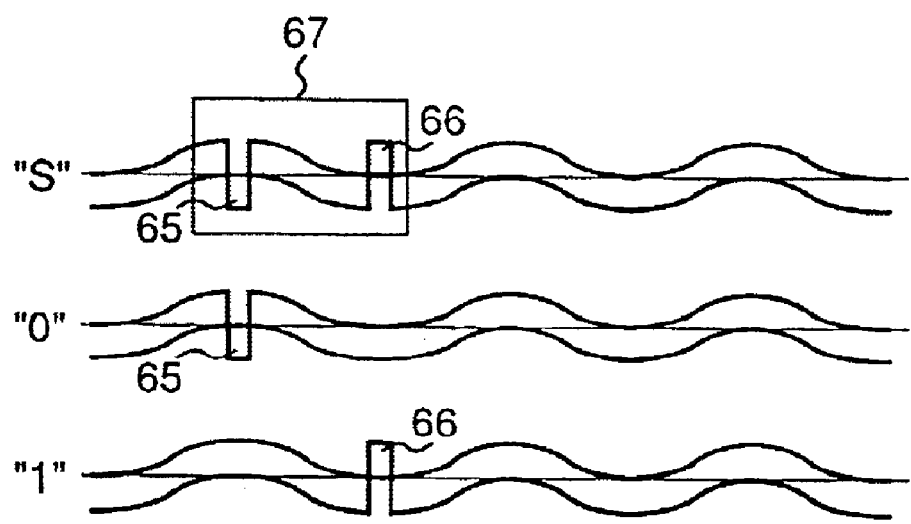
FIG. 10 is a partial enlarged view of an optical disc having marks formed by the groove offset parts according to a second embodiment of the invention.

In an optical disc according to this second embodiment of the invention dispersed addresses are recorded using groove modifications, more specifically using a groove bottom offset 65, a groove top offset 66, and a combination 67 of groove bottom offset 65 and groove top offset 66 as shown in FIG. 10. In the example shown in FIG. 10 a single groove top offset 66 denotes a positive mark (1); a combination 67 containing a groove bottom offset 65 and a groove top offset 66 appearing within a specified time of the groove bottom offset 65 denotes a synchronization mark S; and a groove bottom offset 65 not followed by a groove top offset 66 within a specific time denotes a negative mark (0). The groove bottom offsets and groove top offsets are generically referred to herein as simply "groove offsets." Any one of these parts 65, 66, 67 can be used as a synchronization mark, positive mark, or negative mark, but combination 67 is preferably used as the synchronization marks, which are detected less frequently. The same applies to the alternative versions of this embodiment described below.

A groove bottom offset 65 is formed by creating a momentary offset toward the track center from a peak in the wobble groove. A groove top offset 66 is formed by creating a momentary offset toward the track center from the bottom of a trough in the wobble groove. A combination 67 is formed by creating a groove bottom offset 65 in a peak and a groove top offset 66 in the adjacent trough of the wobble groove.

Note that the groove bottom offset 65 and groove top offset 66 in a combination 67 shown in FIG. 10 are separated ½ wobble period, but could be separated (n+½) (where n is a positive integer) wobble period. Note, further, that the groove bottom offset could be formed as shown in FIG. 9 instead of as in FIG. 8. The groove top offsets could also be formed in the same manner.

Figure 11:
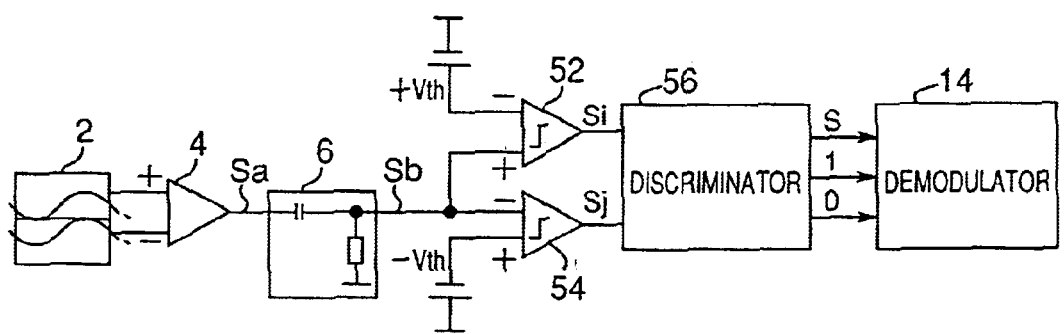
FIG. 11 is a block diagram of an address reader for the optical disc shown in FIG. 10.
Figure 12:
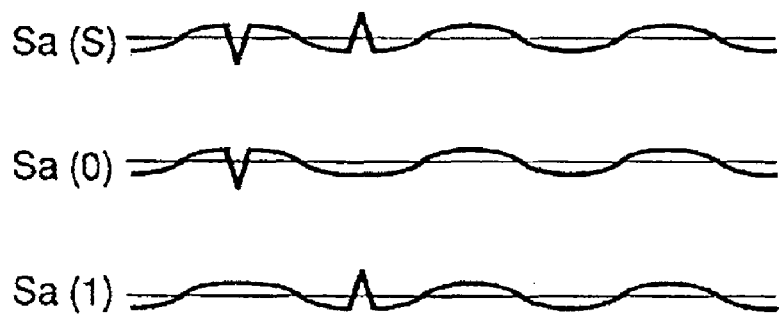
FIG. 12 is a waveform diagram of the output signal from the subtracter shown in FIG. 11 using the optical disc shown in FIG. 10.
Figure 13:
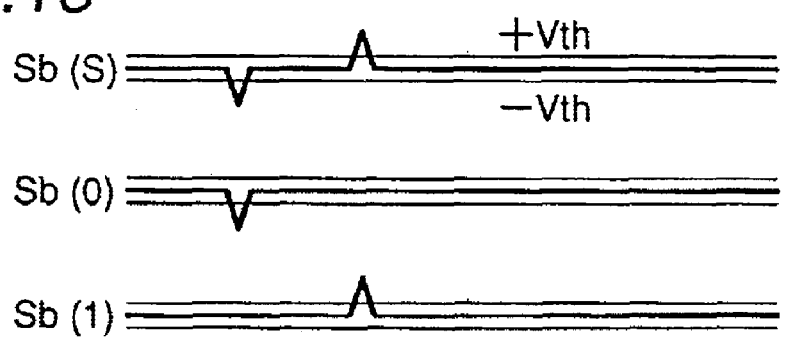
FIG. 13 is a waveform diagram of the output signal from the filter shown in FIG. 11 using the optical disc shown in FIG. 10.
Figure 14:
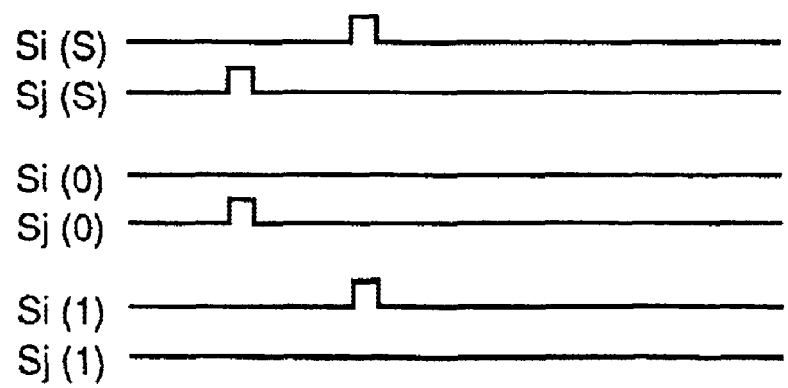
FIG. 14 is a waveform diagram of the output signal from the comparator shown in FIG. 11 using the optical disc shown in FIG. 10.
Figure 15:
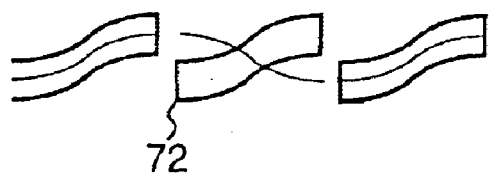
FIG. 15 is an enlarged view of a discontinuous groove phase inversion part.

FIG. 11 shows an address reader for reading dispersed addresses encoded as shown in FIG. 10, and FIGS. 12 to 14 are waveform diagrams of the output signals at major points in the address reader. Like parts in the address reader shown in FIG. 4 and the address reader in FIG. 11 are identified by like reference numerals and further description thereof is omitted below. Shown in FIG. 11 are optical head 2, subtracter 4 outputting difference signal Sa (FIG. 12), high pass filter 6 for outputting groove discontinuity (offset) signal Sb (FIG. 13), comparators 52 and 54, discriminator 56, and demodulator 14. Comparator 52 compares groove discontinuity (top offset) signal Sb with specific first threshold value +Vth (FIG. 13) to output digital groove top offset signal Si (FIG. 14). Comparator 54 compares groove discontinuity (bottom offset) signal Sb with specific second threshold value −Vth (FIG. 13) to output digital groove bottom offset signal Sj (FIG. 14). Discriminator 56 detects whether the digitized groove top/bottom offset signals Si and Sj correspond to a first groove offset (positive mark (1)), second groove offset (negative mark (0)), or third groove offset (synchronization mark S). Demodulator 14 compiles the dispersed address into a single continuous address value.

Signal Sa (S) in FIG. 12 is the difference signal for both groove bottom offset 65 and groove top offset 66 in combination; signal Sa(0) is the difference signal for groove bottom offset 65 only; and signal Sa(1) is the difference signal for groove top offset 66 only. A negative pulse is produced when there is a downward offset at a peak of the wobble groove, and a positive pulse is generated when there is an upward offset in a trough of the wobble groove.

Waveforms for signals Sa(S), Sa(0), and Sa(1) after removing low frequency components are shown as signals Sb(S), Sb(0), and Sb(1) in FIG. 13.

Signals Si(S), Sj(S) in FIG. 14 show the digital pulse signals derived from the positive and negative pulses in signals Sb(S), Sb(0), and Sb(1) shown in FIG. 13. Because signal Sb(S) contains both positive and negative pulses, a pulse is present in both signals Si(S) and Sj(S). Because signal Sb(0) contains only a negative pulse, however, a pulse is present in signal Sj(0) but not in Si(0). Likewise, because signal Sb(1) only has a positive pulse, a pulse is present in Si(1) but not in Sj(1).

The discriminator 56 operates as follows.

If either pulse signal Si or Sj is received and the other pulse signal (Si or Sj) is then also received within a specific period of time (within ½ wobble period), synchronization mark S is detected and signal S indicating the synchronization mark S is therefore output. This synchronization signal S is held until the next mark is detected.

If pulse signal Sj is not received within a specific time (within ½ wobble period) after pulse signal Si is received, positive mark (1) is detected and a "1" signal is output indicating the positive mark (1). This "1" signal is held until the next mark is detected.

If pulse signal Si is not received within a specific time (within ½ wobble period) after pulse signal Sj is received, negative mark (0) is detected and a "0" signal is output indicating the negative mark (0). This "0" signal is held until the next mark is detected.

Signals S, 1, and 0 are signals as shown in the bottom two rows of FIG. 5, and are output from the three output lines of the discriminator 56 shown in FIG. 11.

The demodulator 14 thereafter operates in the same way as the demodulator shown in FIG. 7.

In addition to indicating whether there is an offset, the groove bottom offset 65 and groove top offset 66 contain information indicating the direction of the offset. Separate signals Si and Sj can therefore be generated.

Groove bottom offset 65 and groove top offset 66 can also be used to identify three different meanings (S, 0, 1) in ½ wobble period.

Crosstalk between adjacent tracks also does not occur because the synchronization marks, positive marks, and negative marks are within the width of a maximum amplitude part of the wobble.

Full CLV control is also possible because the sectors are configured without changing the sector length from the inside circumference to the outside circumference of the optical disc and it is not necessary to align the sector block borders in the radial direction of the disc.

The grooves, synchronization marks, positive marks, and negative marks can also be cut using a single laser beam.

Yet further, because the synchronization marks, positive marks, and negative marks are formed offset from the track center, intermixing of data signals with the synchronization mark, positive mark, and negative mark detection signals is minimal even when data is recorded along the track center.

It is also possible to reliably detect groove offsets when the groove offsets are detected with a push-pull signal because the difference signal is large.

(First Alternative Embodiment)

A first alternative version of the groove modifications in the second embodiment of the invention is described below with reference to FIG. 15 to FIG. 20.

Figure 17:
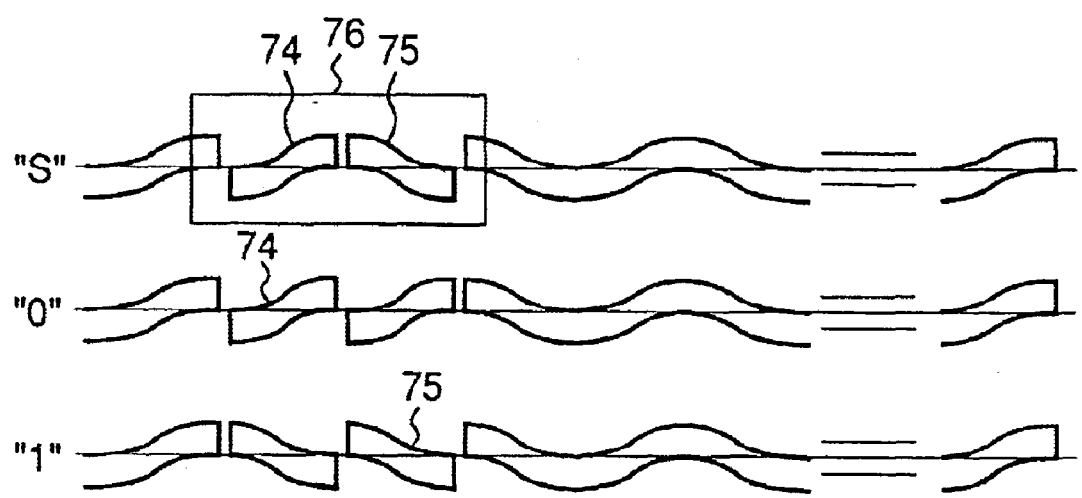
FIG. 17 is a partial enlarged view of an optical disc having marks resulting from the groove phase inversion parts.

While groove bottom offset 65 and groove top offset 66 are used in the embodiment shown in FIG. 10, these are changed to groove descending-phase inversion part 74 and groove ascending-phase inversion part 75 in this first alternative embodiment as shown in FIG. 17. The groove descending-phase inversion part 74 vertically inverts the phase of the sinusoidal wobble wave from the groove peak to the groove trough, that is, an approximately ¼ phase segment of the wobble period from the groove peak. The groove ascending-phase inversion part 75 similarly vertically inverts the phase of the sinusoidal wobble wave from the groove trough to the groove peak, that is, an approximately ¼ phase segment of the wobble period from the groove trough. The groove descending-phase inversion and groove ascending-phase inversion parts are together referred to as the groove phase inversion parts.

Figure 16:
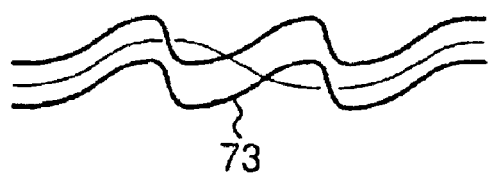
FIG. 16 is an enlarged view of a continuous groove phase inversion part.

As shown in FIG. 17, a synchronization mark S is expressed by a combination 76 of consecutive groove descending-phase inversion 74 and groove ascending-phase inversion 75 parts. A negative mark (0) contains only groove descending-phase inversion part 74, and a positive mark (1) contains only groove ascending-phase inversion part 75. The ends of the ¼ wobble period segments can be discontinuities in the groove as indicated in FIG. 16 or sudden displacements in the groove as shown in FIG. 16.

These marks can be read with an address reader as shown in FIG. 11.

Figure 18:
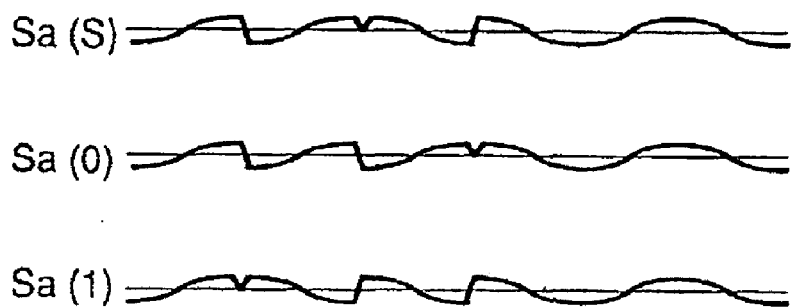
FIG. 18 is a waveform diagram of the output signal from the subtracter shown in FIG. 11 using the optical disc shown in FIG. 17.

FIG. 18 shows the difference signals for the groove phase inversions corresponding to the three marks shown in FIG. 17. These difference signals are output from the subtracter 4. As will be known from difference signal Sa(S), a difference signal that drops abruptly to the right is obtained where the phase inverts and there is an abrupt top-to-bottom change in the groove, and a difference signal that rises abruptly to the right is obtained where the phase inverts and there is an abrupt bottom-to-top change in the groove.

Figure 19:
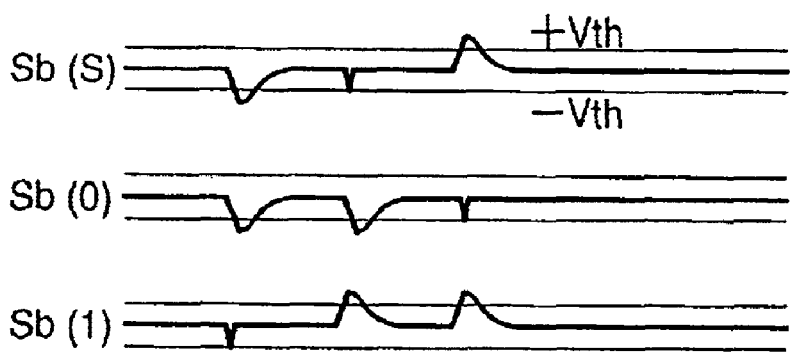
FIG. 19 is a waveform diagram of the output signal from the filter shown in FIG. 11 using the optical disc shown in FIG. 17.

FIG. 19 shows the difference signal after it passes the high pass filter 6. A difference signal that drops abruptly to the right appears as a negative pulse, and a difference signal that rises abruptly to the right appears as a positive pulse.

Figure 20:
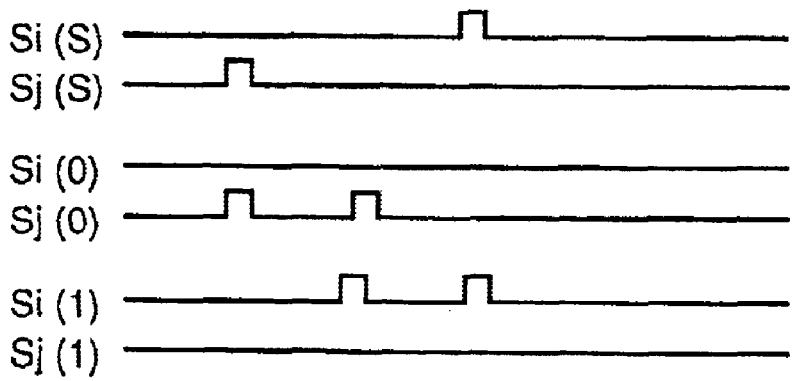
FIG. 20 is a waveform diagram of the output signal from the comparator shown in FIG. 11 using the optical disc shown in FIG. 17.

FIG. 20 shows signal Si as the digitized version of the positive pulse output by comparator 52, and signal Sj as the digitized version of the negative pulse output by comparator 54.

Discriminator 56 operates as follows in this case.

If either pulse signal Si or Sj is received and the other pulse signal (Si or Sj) is then also received within a first specific period of time (within the wobble period), synchronization mark S is detected and signal S indicating the synchronization mark S is therefore output. This synchronization signal S is held until the next mark is detected.

If a second pulse signal Si is received within a second specific time (within ½ wobble period) after a first pulse signal Si is received, positive mark (1) is detected and a "1" signal is output indicating the positive mark (1). The further condition that pulse signal Sj is not detected between the first and second pulse signals Si can also be applied. This "1" signal is held until the next mark is detected.

If a second pulse signal Sj is received within a second specific time (within ½ wobble period) after a first pulse signal Sj is received, negative mark (0) is detected and a "1" signal is output indicating the negative mark (0). The further condition that pulse signal Si is not detected between the first and second pulse signals Sj can also be applied. This "0" signal is held until the next mark is detected.

Subsequent signal processing is handled by the demodulator 14 as described above.

In addition to indicating whether there is a phase inversion, the groove descending-phase inversion 74 and groove ascending-phase inversion 75 parts contain information indicating the inversion direction. Separate signals Si and Sj can therefore be generated.

Groove descending-phase inversion part 74 and groove ascending-phase inversion part 75 can also be used to identify three different meanings (S, 0, 1) in one wobble period.

Crosstalk between adjacent tracks also does not occur because the synchronization marks, positive marks, and negative marks are within the width of the maximum amplitude part of the wobble.

Full CLV control is also possible because the sectors are configured without changing the sector length from the inside circumference to the outside circumference of the optical disc and it is not necessary to align the sector block borders in the radial direction of the disc.

The grooves, synchronization marks, positive marks, and negative marks can also be cut using a single laser beam.

Furthermore, because the phase inverts where wobble amplitude is greatest, the locations of the synchronization mark S, positive mark (1), or negative mark (0) can be detected with good precision.

It should be noted that the groove descending-phase inversion part 74 and groove ascending-phase inversion part 75 could also be detected by detecting the wobble phase. This results in a greater improvement in the S/N ratio than does detecting the phase inversion edge.

(Second Alternative Embodiment)

A second alternative version of the groove modifications in the second embodiment of the invention is described below with reference to FIG. 21 to FIG. 25.

While groove bottom offset 65 and groove top offset 66 are used in the embodiment shown in FIG. 10, these are changed in this second alternative version of the second embodiment to descending rectilinear groove part 83 and ascending rectilinear groove part 84. There is an abrupt rectilinear drop from the peak to the trough of the sinusoidally wobbled groove in the descending rectilinear groove part 83. That is, the groove is formed at the peak level for ¼ wobble cycle from the groove peak, the level then drops abruptly to the trough level, and the groove is then formed at the trough level for the next approximately ¼ wobble cycle, connecting to the groove trough. In ascending rectilinear groove part 84 there is an abrupt rectilinear rise from the trough to the peak of the sinusoidally wobbled groove. That is, the groove is formed at the trough level through the ¼ wobble cycle from the groove trough, the level then rises abruptly to the peak level, and the groove is then formed at the peak level in the next approximately ¼ wobble cycle, connecting to the groove peak. These rectilinear descending and ascending groove parts are referred to herein as the rectilinear groove parts. Furthermore, a wobble wave containing a rectilinear groove part, groove phase inversion, or groove offset part is referred to as a modified wobble wave.

Figure 21:
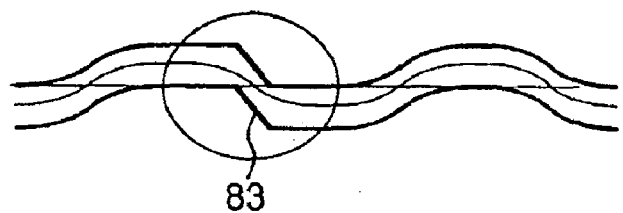
FIG. 21 is an enlarged view of the rectilinear portion of the groove.
Figure 22:
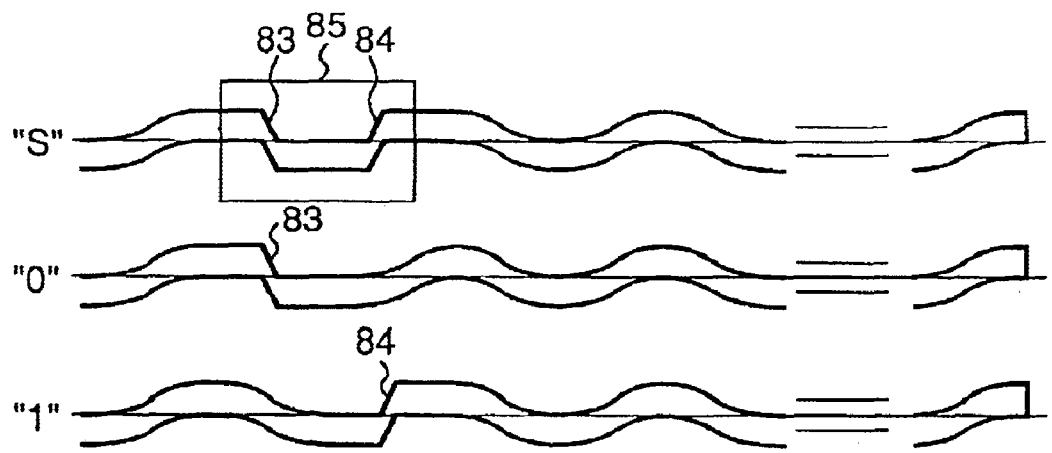
FIG. 22 is a partial enlarged view of an optical disc having marks formed by a rectilinear portion of the groove.

As shown in FIG. 22, a synchronization mark S is expressed by a combination 85 of descending rectilinear groove part 83 and ascending rectilinear groove part 84, a negative mark (0) is recorded using only descending rectilinear groove part 83, and a positive mark (1) is recorded using only ascending rectilinear groove part 84. FIG. 21 shows a descending rectilinear groove part 83 in detail.

These marks can be read using an address reader as shown in FIG. 11.

Figure 23:
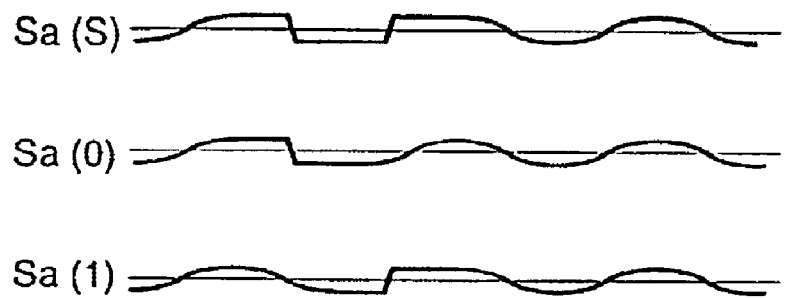
FIG. 23 is a waveform diagram of the output signal from the subtracter shown in FIG. 11 using the optical disc shown in FIG. 22.

FIG. 23 shows the difference signal for rectilinear groove parts corresponding to the three marks shown in FIG. 22. These difference signals are output by the subtracter 4 shown in FIG. 11. As will be known from difference signal Sa(S), a difference signal that drops abruptly to the right is obtained where there is a steeper change outwardly from top-to-bottom in the rectilinear groove part, and a difference signal that rises abruptly to the right is obtained where there is a steeper change inwardly from bottom-to-top in the rectilinear groove part.

Figure 24:
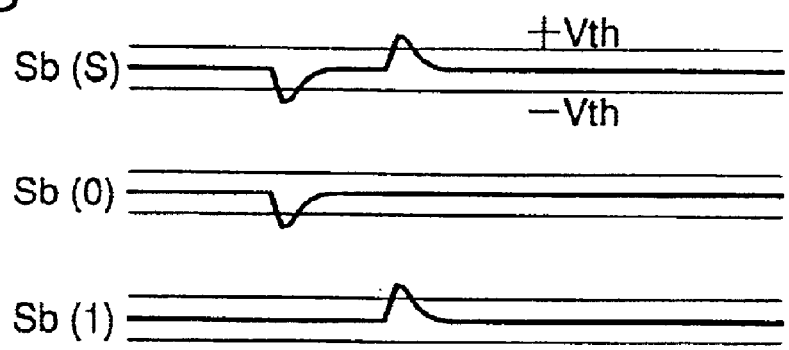
FIG. 24 is a waveform diagram of the output signal from the filter shown in FIG. 11 using the optical disc shown in FIG. 22.

FIG. 24 shows the difference signal after it passes high pass filter 6. A difference signal that drops abruptly to the right appears as a negative pulse, and a difference signal that rises abruptly to the right appears as a positive pulse.

Figure 25:
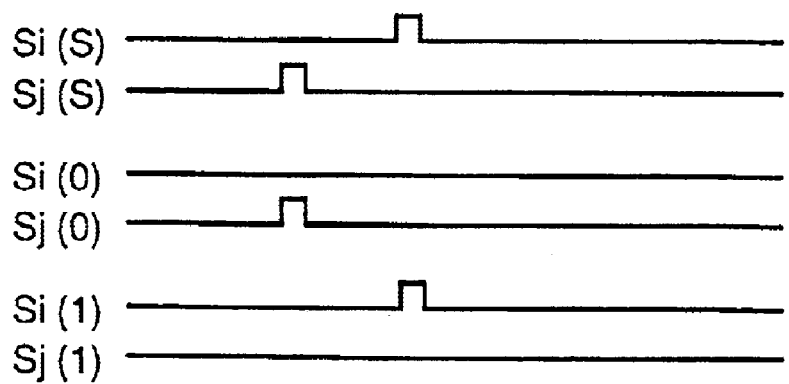
FIG. 25 is a waveform diagram of the output signal from the comparator shown in FIG. 11 using the optical disc shown in FIG. 22.

FIG. 25 shows signal Si as the digitized version of the positive pulse output by comparator 52, and signal Sj as the digitized version of the negative pulse output by comparator 54.

Discriminator 56 operates as follows in this case.

If either pulse signal Si or Sj is received and the other pulse signal (Si or Sj) is then also received within a first specified time (within the wobble period), synchronization mark S is detected and signal S indicating the synchronization mark S is therefore output. This synchronization signal S is held until the next mark is detected.

If pulse signal Sj is not received within a specified time (within the wobble period) after pulse signal Si is received, positive mark (1) is detected and a "1" signal is output indicating the positive mark (1). This "1" signal is held until the next mark is detected.

If pulse signal Si is not received within a specified time (within the wobble period) after pulse signal Sj is received, negative mark (0) is detected and a "0" signal is output indicating the negative mark (0). This "0" signal is held until the next mark is detected.

The demodulator 14 thereafter operates as described above.

In addition to indicating whether there is a rectilinear part in the wobble groove, the descending rectilinear groove part 83 and ascending rectilinear groove part 84 contain information indicating the direction. Separate signals Si and Sj can therefore be generated.

The descending rectilinear groove part 83 and ascending rectilinear groove part 84 can also be used to identify three different meanings (S, 0, 1) in a wobble period.

Crosstalk between adjacent tracks also does not occur because the synchronization marks, positive marks, and negative marks are within the width of the maximum amplitude part of the wobble.

Full CLV control is also possible because the sectors are configured without changing the sector length from the inside circumference to the outside circumference of the optical disc and it is not necessary to align the sector block borders in the radial direction of the disc.

The grooves, synchronization marks, positive marks, and negative marks can also be cut using a single laser beam.

Furthermore, because the rectilinear part is formed across the peak amplitude part of the wobble, the position of the synchronization mark, positive mark, or negative mark can be highly precisely detected.

Yet further, because the zero cross point of the sinusoidal wobble wave and the zero cross point of the rectilinear part are the same, the clock signal will not be disrupted at a mark when the clock signal is extracted from the wobble.

Figure 26:
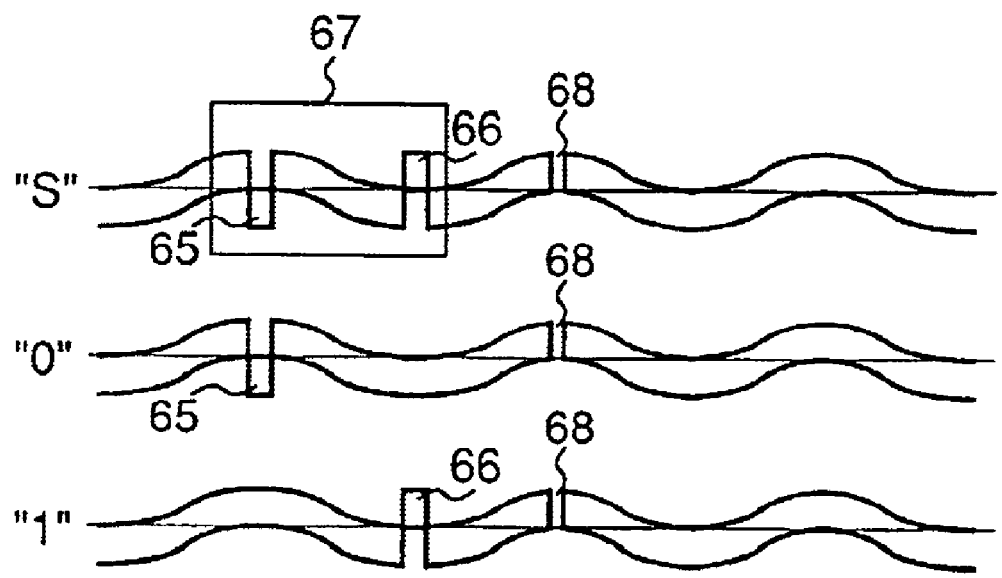
FIG. 26 is an enlarged view of an optical disc having groove discontinuities unifying the recording start positions.

It should be noted that in this second embodiment the location of the groove modification differs in S, 0, and 1 marks, and the location where recording can start therefore also differs. An additional mark is needed in order to unify the positions from which recording can start. For example, a groove discontinuity 68 can be added as shown in FIG. 26 to the embodiment shown in FIG. 10. More specifically, the recording start positions can be unified by starting recording after detecting a groove discontinuity 68.

(Third Alternative Embodiment)

A third alternative version of the groove modifications in the second embodiment of the invention is described below with reference to FIG. 27 to FIG. 31.

The embodiment shown in FIG. 22 uses one modified wobble wave to record one mark. More specifically, one descending rectilinear groove part 83 denotes one negative mark (0), one ascending rectilinear groove part 84 denotes one positive mark (1), and one rectilinear pair 85 (containing one descending rectilinear groove part 83 and one ascending rectilinear groove part 84) denotes a synchronization mark S.

Figure 27:
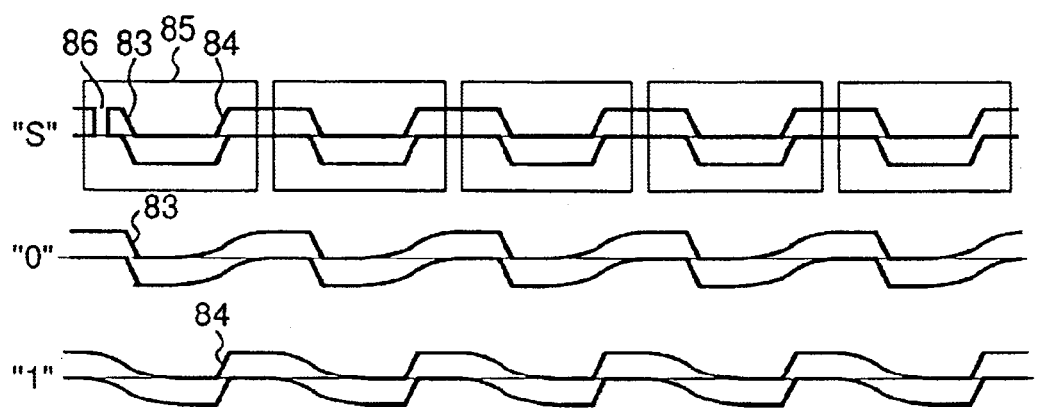
FIG. 27 is an enlarged view of an optical disc having marks formed by consecutive rectilinear groove portions.

In the third alternative embodiment shown in FIG. 27, however, a succession of modified wobble waves are used. That is, a specific plural number of wobble wave cycles (such as 32 cycles) is included in the header 102 of one sector 104 included in the sector block 105 shown in FIG. 2. To record a synchronization mark, the rectilinear pair 85 is repeated to occupy plural cycles (such as 32 cycles in the header 102 as shown in the top row in FIG. 27. To record a negative mark (0), the descending rectilinear groove part 83 is repeated plural times in plural wobble wave cycles (e.g., 32 cycles) in the header 102 as shown in the middle row in FIG. 27. To record a positive mark (1), the ascending rectilinear groove part 84 is repeated plural times in plural wobble wave cycles (e.g., 32 cycles) in the header 102 as shown in the bottom row in FIG. 27.

In yet another embodiment the modified wobble wave is recorded not just in the header 102 but throughout all sectors 104 containing a recording area 103. For example, if there are 153 wobble wave cycles in one sector, the modified wobble wave is recorded to all 153 cycles of the wobble wave.

More specifically, a modified wobble wave containing the rectilinear pair 85 is recorded for 153 continuous cycles throughout the first sector in the sector block 105, and each rectilinear pair 85 is used to represent synchronization data S. If a negative value 0 is to be recorded to the remaining sectors following the first sector in the block, a modified wobble wave containing the descending rectilinear groove part 83 is recorded for 153 continuous cycles throughout each sector. Likewise, if a positive value 1 is to be recorded to the remaining sectors, a modified wobble wave containing the ascending rectilinear groove part 84 is recorded for 153 continuous cycles throughout the sector.

It will be apparent that it is not necessary to repeat the modified wobble wave throughout the sector, and it can be repeated a certain plural number of cycles at any part of the sector. Furthermore, the plural cycles in which the modified wobble wave is recorded can be non-contiguous, such as every other cycle. By thus inserting space between the cycles containing the modified wobble wave other information can also be recorded by measuring the gap between the cycles.

By thus recording data to the wobble waves using modified wobble waves as described above, it is not necessary to use track space to record the synchronization mark S, positive mark (1), or negative mark (0), and data can be extracted by observing the shape of the modified wobble waves of the track. It as therefore not necessary to insert the synchronization mark S, positive mark (1), or negative mark (0) to the header 102 or other specific location, and they can be recorded at a desirable location.

A discontinuity 86 is also recorded in the first wobble wave as shown in the top row in FIG. 27 in order to make detecting the start of the sector block easier and more reliable. This discontinuity 86 can be disposed to the peak of the wobble wave as shown in FIG. 27 or in the trough (that is, at a peak amplitude part of the wave), or at the zero cross point of the descending rectilinear groove part 83 or ascending rectilinear groove part 84 (that is, at the minimum amplitude part of the wave). The discontinuity 86 is preferably disposed at the zero cross point because the discontinuity 86 will then not produce unnecessary noise during wobble wave frequency detection. It will be further noted that this location of discontinuities also applies to the discontinuities described in the first embodiment above.

It will be noted that the discontinuity 86 in FIG. 27 is formed by interrupting the track groove and overwriting data to the discontinuity 86 is therefore difficult. This is because light reflection differs greatly depending on whether or not the groove is present and the discontinuity 86 behaves like noise in the playback signal. In the present embodiment, therefore, the area containing such a discontinuity 86 (such as block 85) is used as a VFO recording area. A VFO recording area is an area where a monotone VFO signal is recorded for generating the PLL used to playback the data recorded after the VFO recording area. Some variation in such external noise simply appears as local jitter in a VFO area, and will not directly produce an error. Furthermore, frequency separation of noise caused by the discontinuity 86 is also possible because the VFO signal is a monotone signal.

Figure 31:
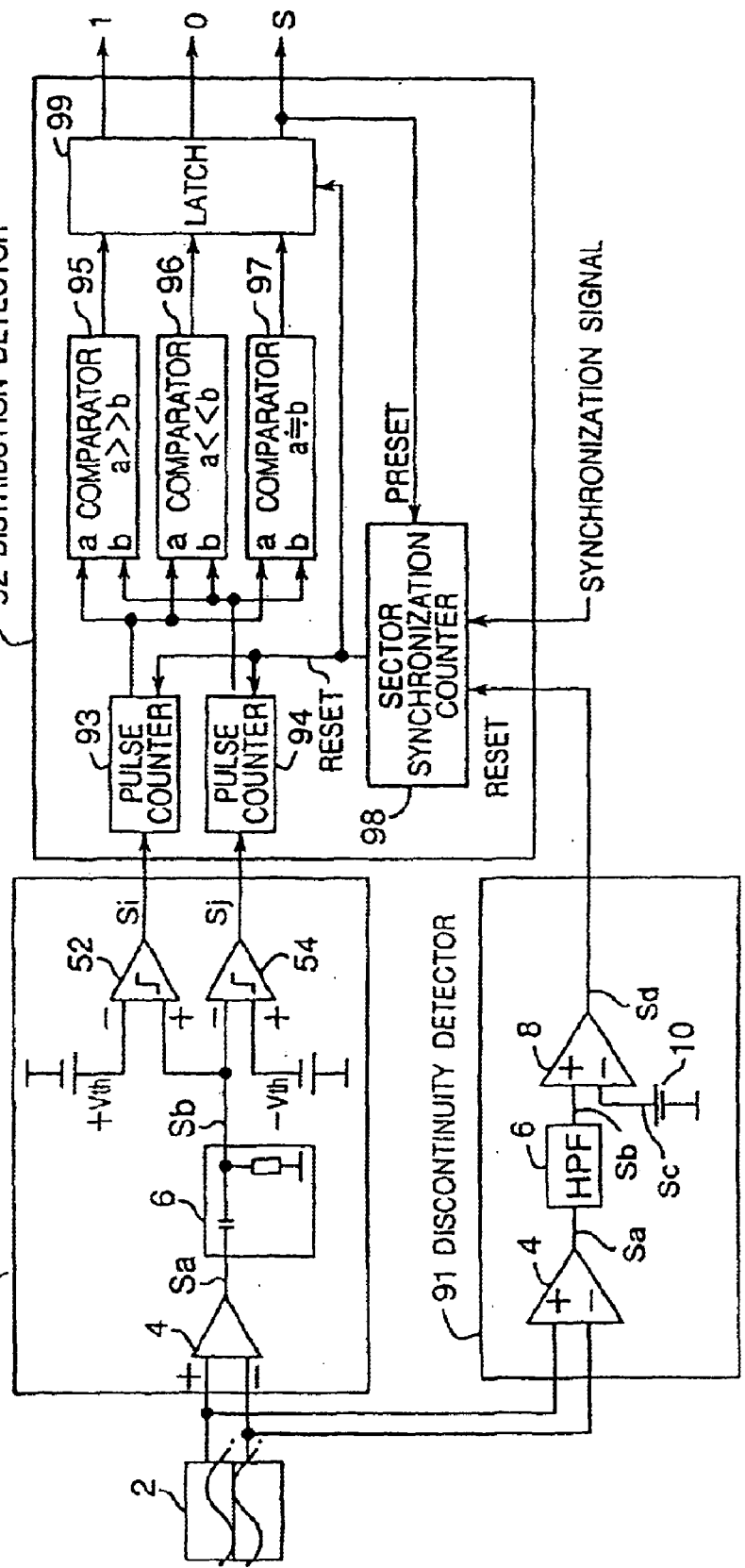
FIG. 31 is a block diagram of an address reader for an optical disc as shown in FIG. 27.

FIG. 31 is a block diagram of a reader for reading a modified wobble wave as shown in FIG. 27.

The reader shown in FIG. 31 comprises a rectilinear wave detector 90, discontinuity detector 91, and distribution detector 92. The rectilinear wave detector 90 uses the major parts of the address reader shown in FIG. 11. Waveforms of the signals at major points in the rectilinear wave detector 90 are shown in FIG. 28, FIG. 29, and FIG. 30.

Figure 28:
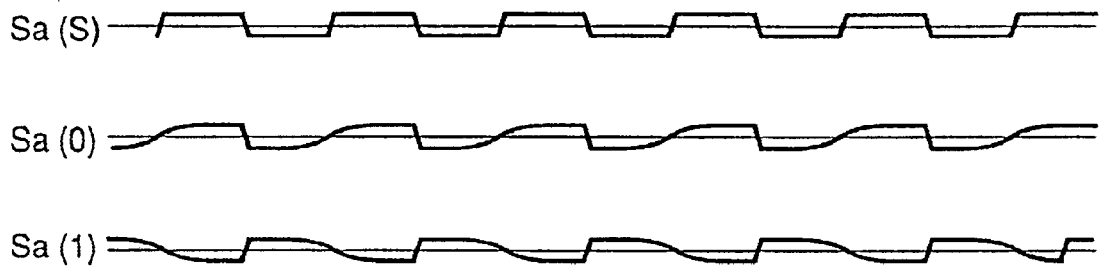
FIG. 28 is a waveform diagram of the output signal from the subtracter of the rectilinear wave detector in FIG. 31 using an optical disc as shown in FIG. 27.

FIG. 28 shows the difference signals for the three modified wobble waves shown in FIG. 27. These difference signals are output by the subtracter 4 shown in FIG. 31. This subtracter 4 operates as described with reference to FIG. 11.

Figure 29:
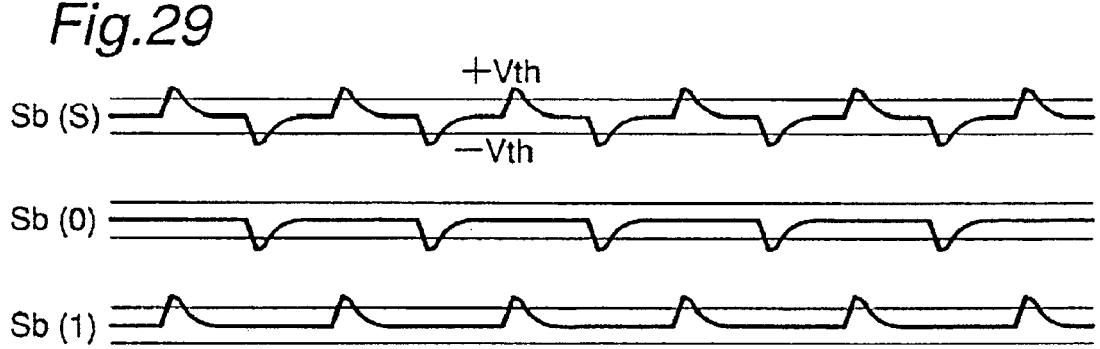
FIG. 29 is a waveform diagram of the output signal from the filter of the rectilinear wave detector in FIG. 31 using an optical disc as shown in FIG. 27.

FIG. 29 shows the difference signals after passing the high pass filter 6. A difference signal that drops abruptly to the right appears as a negative pulse, and a difference signal that rises abruptly to the right appears as a positive pulse.

Figure 30:
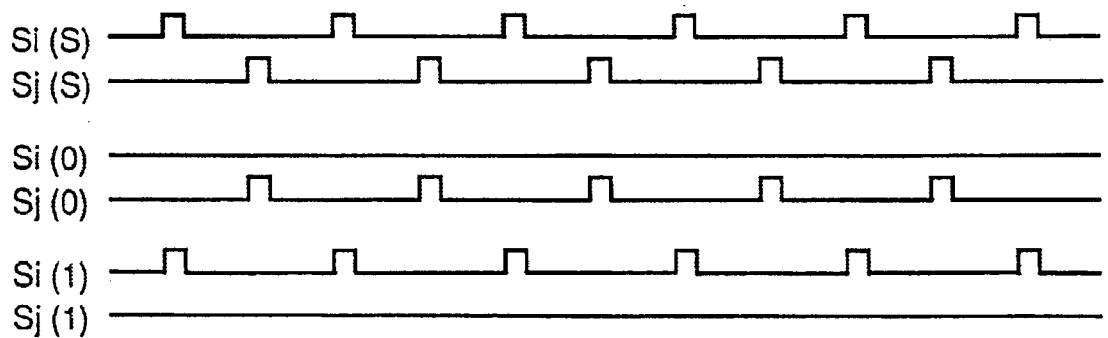
FIG. 30 is a waveform diagram of the output signal from the comparator of the rectilinear wave detector in FIG. 31 using an optical disc as shown in FIG. 22.

FIG. 30 shows signal Si as the digital version of the positive pulse output by comparator 52, and signal Sj as the digital version of the negative pulse output by comparator 54. In a modified wobble wave containing repeated rectilinear pairs 85, a pulse appears in both signals Si and Sj. These pulses appear once per cycle in the modified wobble wave.

Operation when the modified wobble wave has 153 cycles per sector is described next. In the first sector (the sector containing the synchronization mark S) there are 153 pulses in signal Si and 153 pulses in signal Sj. If the following sector records 0 data (negative mark (0)) there are no pulses in signal Si and 153 pulses in signal Sj. If the following sector records 1 data (positive mark (1)) there are 153 pulses in signal Si and no pulses in signal Sj. Note that due to noise and other factors the actual number of pulses may vary.

The discontinuity detector 91 shown in FIG. 31 uses the major parts of the address reader shown in FIG. 4. As described with reference to FIG. 5, a pulse is output when a discontinuity 86 is detected. Note that the subtracter 4 disposed in discontinuity detector 91 can be changed to an adder. When a subtracter is used the discontinuity 86 can only be detected when it is near a wobble wave peak, but when an adder is used discontinuity 86 can be detected near the peak and near the zero cross.

The distribution detector 92 shown in FIG. 31 is described next.

The distribution detector 92 comprises pulse counters 93 and 94, comparators 95, 96, 97, sector synchronization counter 98, and latch 99. Pulse counters 93 and 94 count the number of pulses in signals Si and Sj, respectively. Pulse counter 93 outputs the accumulated count to input b of comparators 95, 96, 97. If a>b (where a is the count applied to input a, and b is the count applied to input b) and the difference is preferably sufficiently great (that is, a>>b), comparator 95 outputs high. If a<b and the difference is preferably sufficiently great (that is, a<<b), comparator 96 outputs high. If a≈b and the difference is preferably sufficiently small, comparator 97 outputs high.

These high signals are applied to the latch 99. If a high signal is received from comparator 95, latch 99 outputs a 1 indicating a positive mark (1). This 1 signal is held until data for the next sector is detected. If the latch 99 receives a high from comparator 96, latch 99 outputs a 0 signal indicating a negative mark (0). This 0 signal is held until data for the next sector is detected. If a high from comparator 97 is detected, latch 99 outputs an S signal indicating a synchronization mark S. This S signal is held until data for the next sector is detected.

The sector synchronization counter 98 counts the number of cycles in the synchronization signal (the same number of cycles as the wobble wave, but the wobble wave contains noise and the number is not stable). The synchronization signal is generated by a PLL circuit from the detected wobble signal, for example. First, the count is reset to zero at the discontinuity detection pulse from the discontinuity detector 91. The number of pulses in the synchronization signal, that is, the synchronization pulses, is then counted. The wobble wave has 153 cycles per sector in the present embodiment as noted above. A reset signal is therefore output to the pulse counters 93 and 94 and latch 99 every time 153 pulses are counted, and the pulse counters 93 and 94 are reset.

The distribution detector 92 compares the number of pulses in signal Si in one sector with the number of pulses in signal Sj. If the number of signal Si pulses is sufficiently greater than the number of signal Sj pulses, comparator 95 outputs high. Conversely, if the number of signal Sj pulses is sufficiently greater than the number of signal Si pulses, comparator 96 outputs high. If the number of Si pulses and Sj pulses is almost equal, comparator 97 outputs high. The latch 99 latches a high signal from any of comparators 95, 96, 97 and appropriately outputs a 1 or 0 signal. The sector synchronization counter 98 is reset by an S signal.

Subsequent signal processing is handled by the demodulator 14 as described above.

The 1, 0, and S signals can be detected more accurately by thus repeating the modified wobble wave. Furthermore, adverse effects of the wobble wave on the synchronization signal that must be detected can be minimized if a modified wobble wave containing a rectilinear component as described above is included in the modified wobble wave.

(Fourth Alternative Embodiment)

Figure 32:
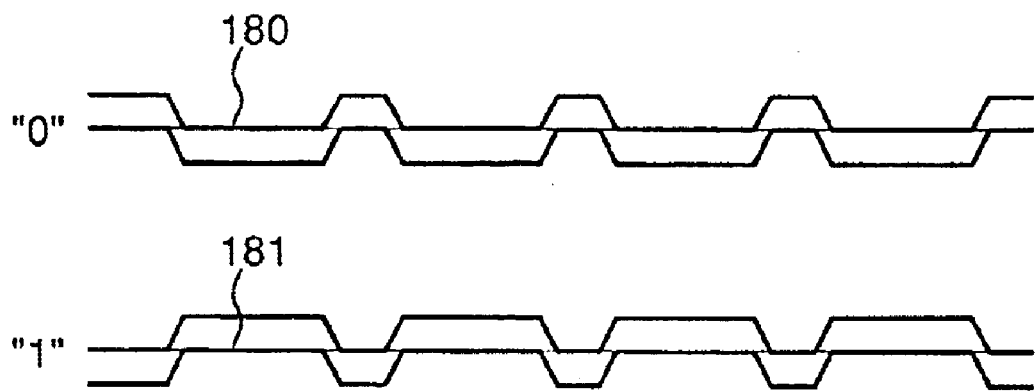
FIG. 32 is a plan view of a wobble in which the duty ratio varies.

FIG. 32 shows the major components of a fourth alternative embodiment. In the embodiment shown in FIG. 32 the length of the positive amplitude parts and negative amplitude parts of the wobble wave differ so that the duty ratio can be changed without changing the wobble frequency. More specifically, in FIG. 32 the length of the negative amplitude part 180 of the wobble wave is longer than the positive amplitude part, and the length of the positive amplitude part 181 is longer than the negative amplitude part. The wobble is thus formed so that this part 180 is longer in a negative mark (0) and part 181 is longer in a positive mark (1) as shown in FIG. 32. It is therefore not necessary to differentiate the playback signal when discriminating the negative and positive data marks and the effects of noise can be reduced because a clock timer, for example, can be used to measure the duty ratio.

(Fifth Alternative Embodiment)

Figure 33:
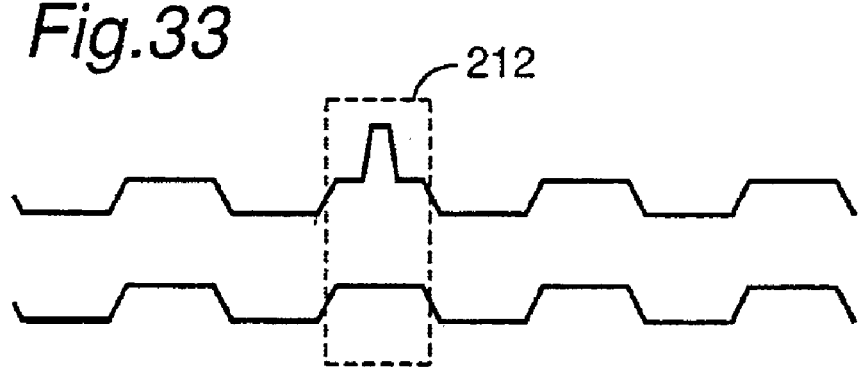
FIG. 33 is a plan view of a block mark.

FIG. 33 shows the major components of a fifth alternative embodiment. While a discontinuity 86 is formed in the first wobble wave in the embodiment shown in FIG. 27, a mark 212 locally increasing the track groove width is formed in this embodiment shown in FIG. 33.

This mark 212 is used to detect the beginning of a sector block and is referred to as a block mark. The configuration shown in FIG. 33 does not produce a discontinuity interrupting the groove, and information other than the VFO signal can therefore be recorded using block marks. As a result, overhead can be reduced.

(Sixth Alternative Embodiment)

Figure 34:
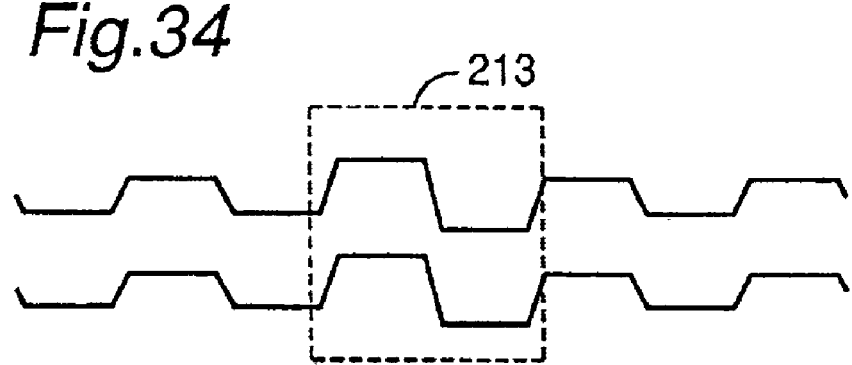
FIG. 34 is a plan view of another block mark.

FIG. 34 shows the major components of a sixth alternative embodiment. The variation shown in FIG. 34 forms a block mark 213 creating a local increase in groove wobble amplitude. Similarly to the variation shown in FIG. 33, this embodiment does not cause a discontinuity in the groove, and information other than the VFO signal can therefore be recorded using block marks.

(Seventh Alternative Embodiment)

Figure 35:
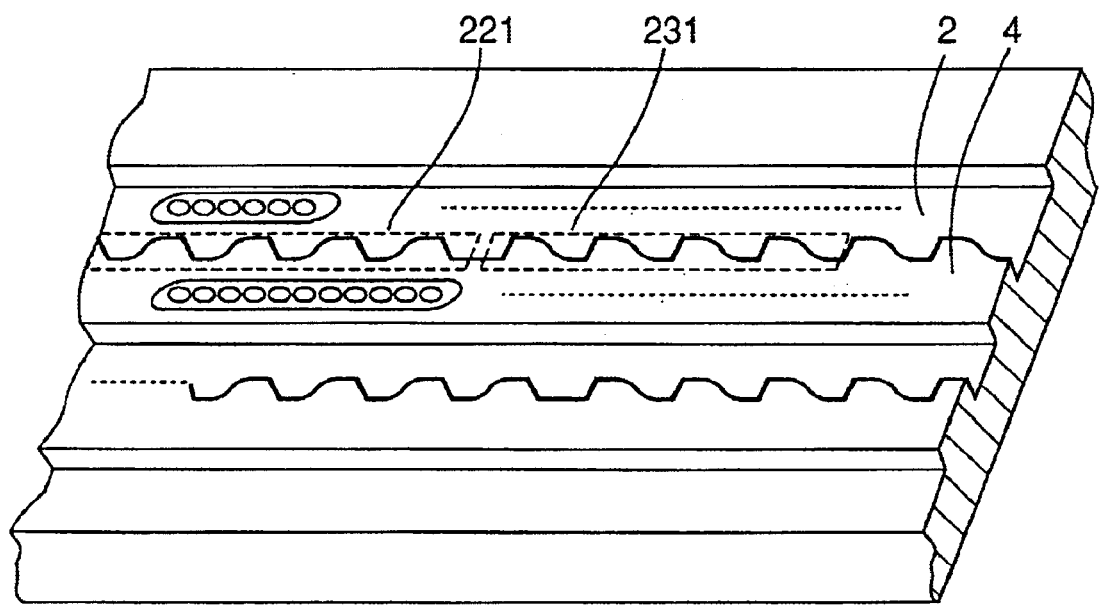
FIG. 35 is an oblique view showing the wobble disposed to only one side of the groove.

FIG. 35 shows the major components of a seventh alternative embodiment. In this variation a wobble is formed only to one edge of the track groove. The preceding embodiments and variations apply particularly to so-called groove-recording optical discs that record data to the track groove, but there are also so-called land and groove optical discs that record data to both grooves and lands (the space between grooves) along the track. This seventh alternative embodiment of the invention applies to such land and groove type optical discs.

In the disc shown in FIG. 35 either negative data (0) (indicated by area 221) or positive data (1) (indicated by area 231) is recorded along one edge of the groove. This enables both the groove 2 and adjacent 1 and 4 to be addressed by the same address. Data is recorded to both the land 4 and groove 2. This configuration enables the track pitch to be further reduced so that recording density can be further increased.

As will be known from the preceding description, the present invention forms a wobble of a specific shape and cycle in a unit period of the track groove and records different shapes differing according to uniformly defined secondary information in said unit period. The present invention can therefore provide an optical disc medium that is suitable to high density recording, can record address information that reduces or eliminates overhead, and can generate a monotone wobble playback signal.

What is claimed is:

1. An optical disc comprising:

a track; and a wobbled groove formed along the track and being divided into sector blocks, wherein each of said sector blocks is divided into a plurality of sectors;

wherein said wobbled groove contains positive marks formed in a specific plurality of sectors in each sector block;

wherein a positive mark is indicated by a groove section, in which a wobbling of the wobbled groove, compared to a sinusoidal wobbling, contains a steeper outward inclination, and wherein said positive marks are used for presenting address information of each sector block.

2. An optical disc comprising:

a track; and a wobbled groove formed along the track and being divided into sector blocks, wherein each of said sector blocks is divided into a plurality of sectors;

wherein said wobbled groove contains negative marks formed in a specific plurality of sectors in each sector block;

wherein a negative mark is indicated by a groove section, in which a wobbling of the wobbled groove, compared to a sinusoidal wobbling, contains a steeper inward inclination, and wherein said negative marks are used for presenting address information of each sector block.

* * * * *

UNITED STATES PATENT AND TRADEMARK OFFICE
CERTIFICATE OF CORRECTION

PATENT NO.    : 6,898,175 B2
DATED         : May 24, 2005
INVENTOR(S)   : Shigeru Furumiya et al.

It is certified that error appears in the above-identified patent and that said Letters Patent is hereby corrected as shown below:

Title page,
Item [75], Inventors, change
"Shigeru Furumiya, Himeji (JP);
Hiromichi Ishibashi, Ibaraki (JP);
Takashi Ishida, Yawata (JP);
Yoshiharu Kobayashi, Katano (JP)" to
-- Shigeru Furumiya, Himeji (JP);
Hiromichi Ishibashi, Ibaraki (JP) --.

Signed and Sealed this

Twenty-first Day of February, 2006

JON W. DUDAS
*Director of the United States Patent and Trademark Office*